United States Patent
Park et al.

(10) Patent No.: US 9,395,581 B2
(45) Date of Patent: Jul. 19, 2016

(54) LIQUID CRYSTAL DISPLAY AND MANUFACTURING METHOD THEREOF

(71) Applicant: Samsung Display Co., Ltd., Yongin, Gyeonggi-Do (KR)

(72) Inventors: Jae Hong Park, Seoul (KR); Jin Won Kim, Suwon-si (KR); Oh Jeong Kwon, Hwaseong-si (KR); Heung Shik Park, Seoul (KR); Hyeok Jin Lee, Seongnam-si (KR); Ki Chul Shin, Seongnam-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 51 days.

(21) Appl. No.: 14/463,875

(22) Filed: Aug. 20, 2014

(65) Prior Publication Data
US 2015/0160517 A1  Jun. 11, 2015

(30) Foreign Application Priority Data

Dec. 11, 2013 (KR) .................. 10-2013-0153833

(51) Int. Cl.
| | | |
|---|---|---|
| G02F 1/1337 | (2006.01) | |
| G02F 1/1333 | (2006.01) | |
| G02F 1/1368 | (2006.01) | |
| G02F 1/1362 | (2006.01) | |

(52) U.S. Cl.
CPC ........ *G02F 1/133753* (2013.01); *G02F 1/1368* (2013.01); *G02F 1/133345* (2013.01); *G02F 1/133788* (2013.01); *G02F 1/136277* (2013.01); *G02F 1/136286* (2013.01); *G02F 1/1333* (2013.01); *G02F 1/133351* (2013.01); *G02F 2001/133761* (2013.01)

(58) Field of Classification Search
CPC .............. G02F 1/133753; G02F 2001/133761; G02F 1/1368; G02F 1/133351; G02F 1/1333; G02F 1/133788; G02F 1/136286
See application file for complete search history.

(56) References Cited

U.S. PATENT DOCUMENTS

| | | | |
|---|---|---|---|
| 7,113,241 B2 | 9/2006 | Hanaoka | |
| 8,390,767 B2 | 3/2013 | Kim et al. | |
| 2010/0007841 A1* | 1/2010 | Baek | ............ G02F 1/1309 349/152 |

(Continued)

FOREIGN PATENT DOCUMENTS

| | | |
|---|---|---|
| KR | 100679918 B | 2/2007 |
| KR | 1020080095119 A | 10/2008 |

(Continued)

*Primary Examiner* — Michael Caley
*Assistant Examiner* — Jia Pan
(74) *Attorney, Agent, or Firm* — Cantor Colburn LLP

(57) ABSTRACT

A liquid crystal display includes a first substrate, a gate line and a divided reference voltage line on the first substrate, a gate insulating layer in the gate line and the divided reference voltage line, a semiconductor layer on the gate insulating layer, a data line on the semiconductor layer, a passivation layer on the data line, a pixel electrode on the passivation layer, a second substrate corresponding to the first substrate, and a common electrode in the second substrate, where the gate line, the divided reference voltage line, and the data line extend to one side of the first substrate, a divided reference voltage driving line, and a data driving line, respectively, extensions are provided at ends of the divided reference voltage driving line and the data driving line, short spacers are disposed on the extensions, and the short spacers are in contact with the common electrode.

17 Claims, 25 Drawing Sheets

(56) References Cited

U.S. PATENT DOCUMENTS

2012/0081652 A1 4/2012 Su et al.
2013/0143463 A1* 6/2013 Park .................. G02F 1/133753
　　　　　　　　　　　　　　　　　　　　445/24

FOREIGN PATENT DOCUMENTS

| KR | 1020100069964 A | 6/2010 |
| KR | 1020120088646 A | 8/2012 |

* cited by examiner

LIQUID CRYSTAL DISPLAY AND MANUFACTURING METHOD THEREOF

This application claims priority to Korean Patent Application No. 10-2013-0153833 filed on Dec. 11, 2013, and all the benefits accruing therefrom under 35 U.S.C. §119, the entire contents of which are incorporated herein by reference.

BACKGROUND (a) Field

The invention relates to a manufacturing method of a liquid crystal display ("LCD") and an LCD manufactured thereby.

(b) Description of the Related Art

A liquid crystal display ("LCD") is one of the flat panel displays which are most widely used in recent years. The LCD generally includes two display panels in which a field generating electrode is formed and a liquid crystal layer interposed between the display panels, and a voltage is applied to the field generating electrode, thereby rearranges liquid crystal molecules of a liquid crystal layer to adjust the amount of transmitted light.

In order to increase a response speed of an LCD, various methods for initially aligning the liquid crystal molecules so as to be pretilted have been suggested. Among the initial aligning methods, according to a method which pretilts the liquid crystal molecules using a prepolymer which is polymerized by light such as ultraviolet rays, a desired magnitude of voltage is applied to the field generating electrode and an exposure process is performed.

During the manufacturing process of an LCD, a multi-layered thin film pattern is formed on a mother board through a deposition process and a photolithography process so that a plurality of display panels each having the multi-layered thin film pattern is formed and the mother board is cut to manufacture a display device.

SUMMARY

In a manufacturing process of a liquid crystal display ("LCD"), when a voltage is applied at an initial alignment operation of a liquid crystal molecule, a relatively large amount of time and equipment are required and thus productivity is lowered in case that a voltage is applied to each of divided LCDs and the exposure process is performed.

Further, generally, at an initial alignment operation of a liquid crystal molecule, the same magnitude of voltage is applied to a gate line and a data line of a bottom substrate to perform photo-alignment. In this case, since the same voltage is applied to the gate line and data line, a pretilting angle of the liquid crystal molecule is the same over the entire region of one pixel. In contrast, in order to align the liquid crystal molecules so as to have different pretilting angles for every region of one pixel, an additional input voltage is required.

The invention has been made in an effort to provide a manufacturing method of an LCD which repeatedly cuts an upper mother board and performs a light irradiation process to perform photo-alignment of the liquid crystal molecules so as to have different pretilting angles for every region of one pixel using only two input voltages.

An exemplary embodiment of the invention provides a manufacturing method of an LCD including preparing a lower mother board on which a plurality of lower display panels each including a thin film transistor is provided and a lower alignment layer is applied, preparing an upper mother board on which a plurality of upper display panels corresponding to the plurality of lower display panels is provided and an upper alignment layer is applied, providing a liquid crystal combination layer including liquid crystal between the lower mother board and the upper mother board and combining the lower mother board and the upper mother board to form a mother board assembly, defining a first cutting line and a second cutting line for each of the plurality of upper display panels in the upper mother board of the mother board assembly to divide each of the plurality of upper display panels into a first region and a second region, applying a primary voltage to the first region and the second region of the upper mother board which exposed by the lower mother board to pretilt the liquid crystal, primarily irradiating light onto the mother board assembly from the upper mother board to harden a first alignment supplement which is included in at least one of the liquid crystal combination layer, the lower alignment layer, and the upper alignment layer, defining a third cutting line in the second region of the upper mother board of the mother board assembly to divide the second region into a second-first region and a third region, applying a secondary voltage to the first region and the second-first region of the upper mother board which are exposed by the lower mother board to pretilt the liquid crystal, and secondarily irradiating light onto the mother board assembly from one side to harden a second alignment supplement which is included in at least one of the liquid crystal combination layer, the lower alignment layer, and the upper alignment layer, in which an extension of a data driving line and a part of an edge of the lower display panel are disposed in the first region, an extension of a divided reference voltage driving line and a center region of each of the plurality of lower display panels are disposed in the second region, the center region of each of the plurality of lower display panels is disposed in the second-first region, and the extension of the divided reference voltage driving line is disposed in the third region.

In an exemplary embodiment, the plurality of lower display panels may include a plurality of pixels, a gate driving line which is connected to a gate line of each pixel, a data driving line which is connected to a data line, and the divided reference voltage driving line which is connected to a divided reference voltage line.

In an exemplary embodiment, the data driving line and the divided reference voltage driving line may have extensions which are provided at the same side facing an outside the plurality of lower display panels.

In an exemplary embodiment, a short spacer may be disposed on the extension of the data driving line and the extension of the divided reference voltage driving line and the extension of the data driving line and the extension of the divided reference voltage driving line may be connected to the upper mother board by the short spacer.

In an exemplary embodiment, the first cutting line may be defined outside each of the plurality of lower display panels to separate adjacent lower display panels and the second cutting line may be defined inside the lower display panel to separate the extension of the divided reference voltage line from the extension of the data driving line.

In an exemplary embodiment, in the applying of a primary voltage to the first region and the second region of the upper mother board which are exposed by the lower mother board to pretilt the liquid crystal, the voltage which is applied to the first region may be transmitted to the data driving line through the short spacer which is disposed on the extension of the data driving line.

In an exemplary embodiment, the voltage which is applied to the first region may be a ground voltage.

In an exemplary embodiment, in the applying of a primary voltage to the first region and the second region of the upper mother board which are exposed by the lower mother board to pretilt the liquid crystal, the voltage which is applied to the second region may be transmitted to a common electrode of the upper mother board and may be transmitted to the divided reference voltage driving line through the short spacer which is disposed on the extension of the divided reference voltage driving line.

In an exemplary embodiment, the voltage which is applied to the second region may be about −9.5 volts (V).

In an exemplary embodiment, in the primarily irradiating of light onto the mother board assembly from the upper mother board to harden an alignment supplement which is included in at least one of the liquid crystal combination layer, the lower alignment layer, and the upper alignment layer, only liquid crystal of a first sub-pixel area of one pixel may be pretilted and liquid crystal of a second sub-pixel area may be not pretilted.

In an exemplary embodiment, the third cutting line may be continuously defined with an extension direction of the second cutting line, and the extension of the divided reference voltage driving line may be disposed in the third region which is separated by defining the third cutting line.

In an exemplary embodiment, in the applying of a secondary voltage to the first region and the second-first region of the upper mother board which are exposed by the lower mother board to pretilt the liquid crystal, the voltage which is applied to the first region may be transmitted to the data driving line through the short spacer which is disposed on the extension of the data driving line.

In an exemplary embodiment, the voltage which is applied to the first region may be a ground voltage.

In an exemplary embodiment, in the applying of a secondary voltage to the first region and the second-first region of the upper mother board which are exposed by the lower mother board to pretilt the liquid crystal, the voltage which is applied to the second-first region may be transmitted to the common electrode of the upper mother board.

In an exemplary embodiment, the voltage which is applied to the second-first region may be about −9.5 V.

In an exemplary embodiment, after the secondarily irradiating of light onto the mother board assembly from the upper mother board side to harden an alignment supplement which is included in at least one of the liquid crystal combination layer, the lower alignment layer, and the upper alignment layer, a pretilting degree of the first sub-pixel area of one pixel may be different from a pretilting degree of the second sub-pixel area.

In an exemplary embodiment, the pretilting degree of the first sub-pixel area may be larger than the pretilting degree of the second sub-pixel area by about 0.1 degree or more.

Another exemplary embodiment of the invention provides an LCD including a first substrate, a gate line and a divided reference voltage line which are disposed on the first substrate and electrically separated from each other, a gate insulating layer which is provided in the gate line and the divided reference voltage line, a semiconductor layer which is disposed on the gate insulating layer, a data line which is disposed on the semiconductor layer, a passivation layer which is disposed on the data line, a pixel electrode which is disposed on the passivation layer, a second substrate corresponding to the first substrate, and a common electrode which is provided on the second substrate, in which the gate line, the divided reference voltage line, and the data line may extend to one side of the first substrate to be connected to a gate driving line, a divided reference voltage driving line, and a data driving line, respectively, extensions may be provided at ends of the divided reference voltage driving line and the data driving line, short spacers may be disposed on the extensions, and the short spacers may be in contact with the common electrode.

In an exemplary embodiment, a plurality of cutting lines may be defined in the second substrate and the cutting lines may divide the LCD into a first region in which the extension of the gate driving line and the extension of the data driving line are disposed, a second region in which the extension of the divided reference voltage driving line is disposed, and a third region in which the extension of the gate driving line, the extension of the data driving line, and the extension of the divided reference voltage driving line are not provided.

In an exemplary embodiment, a region of the first substrate in which an extension of the gate line, an extension of the divided reference voltage line, and an extension of the data line are disposed and a region of the second substrate corresponding to the region of the first substrate may be configured to be separated and removed.

As described above, according to the manufacturing method of the invention, a process of cutting an upper mother board and irradiating light is repeatedly performed so that only two input voltages are used to perform photo-alignment of the liquid crystal molecule for one pixel so that different pretilt angles are provided in every region. Therefore, a texture of an integrated pixel is controlled and differentiated pretilt is implemented in one pixel without using three input voltages.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
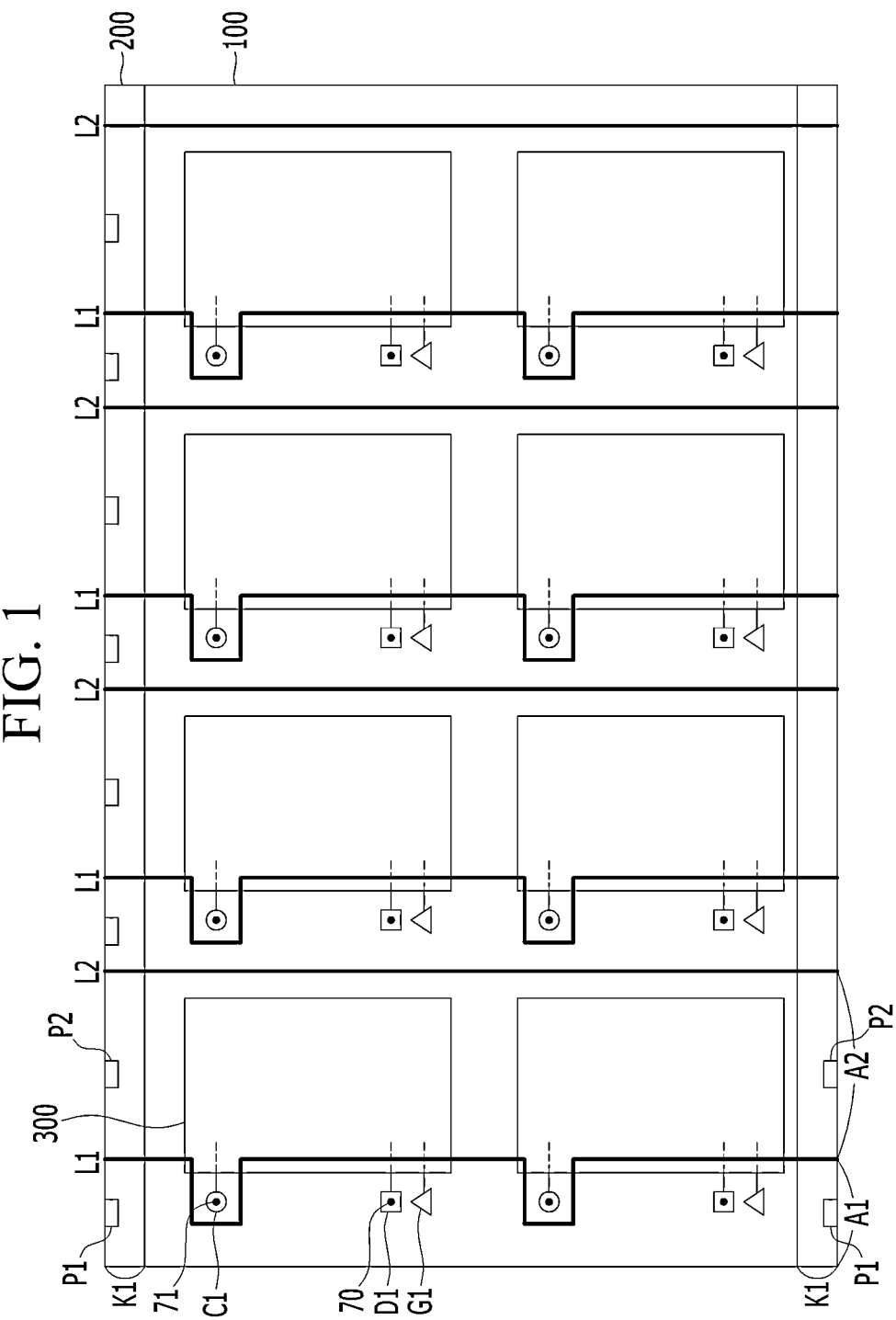
FIG. 1 is a top plan view of an exemplary embodiment of a mother board assembly for explaining a manufacturing method of a liquid crystal display ("LCD") according to the invention.

The invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a manufacturing method of a liquid crystal display ("LCD") according to an exemplary embodiment of the invention will be described in detail with reference to the drawings.

First, a manufacturing method of an LCD according to an exemplary embodiment of the invention will be described in brief with reference to FIGS. 1 to 3.

FIG. 1 is a top plan view of an exemplary embodiment of a mother board assembly for explaining a manufacturing method of an LCD according to the invention.

Figure 2:
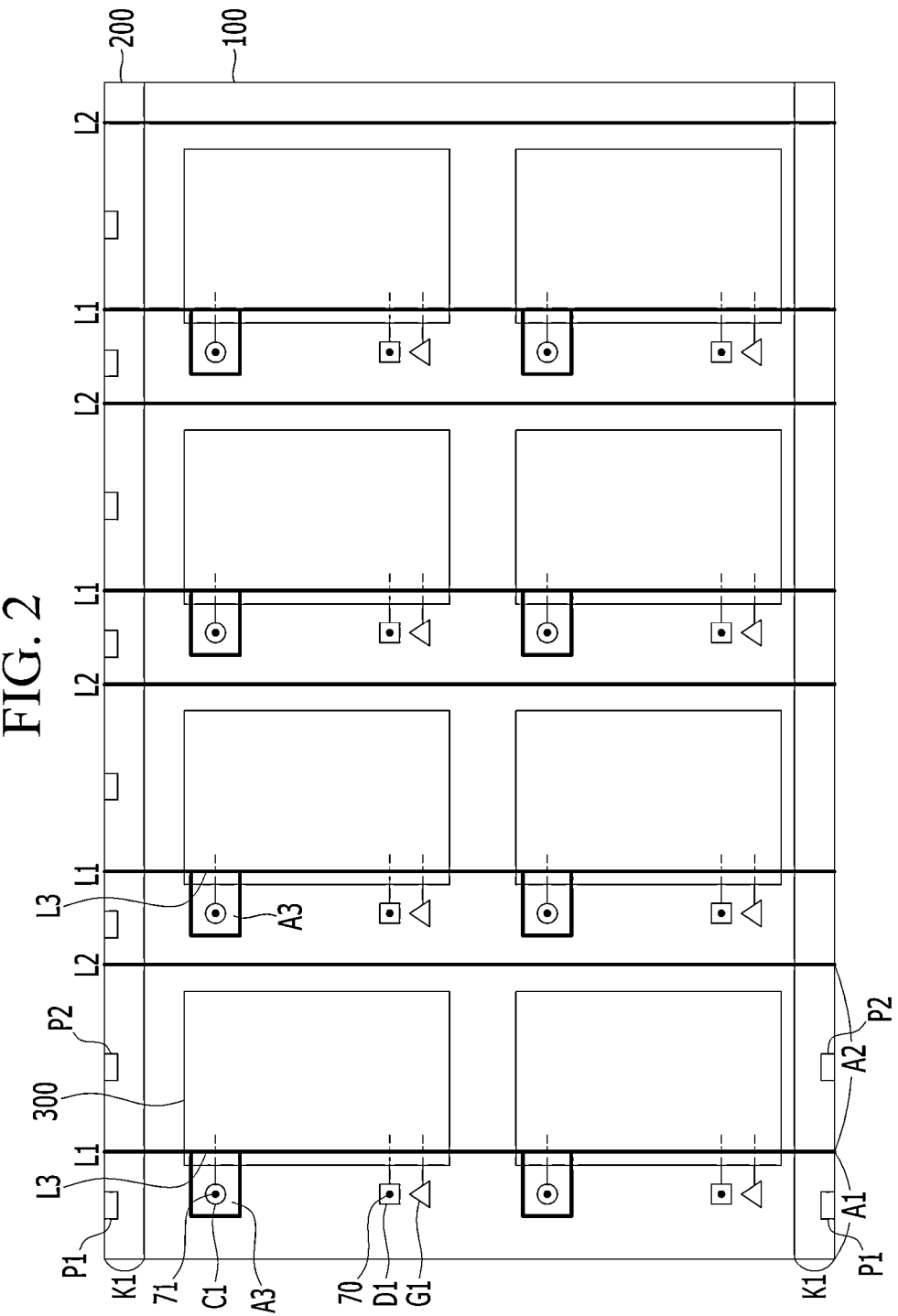
FIG. 2 is a top plan view of an exemplary embodiment of a mother board assembly for explaining a manufacturing method of an LCD according to the invention.

FIG. 2 is a top plan view of an exemplary embodiment of a mother board assembly for explaining a manufacturing method of an LCD according to the invention.

Figure 3:
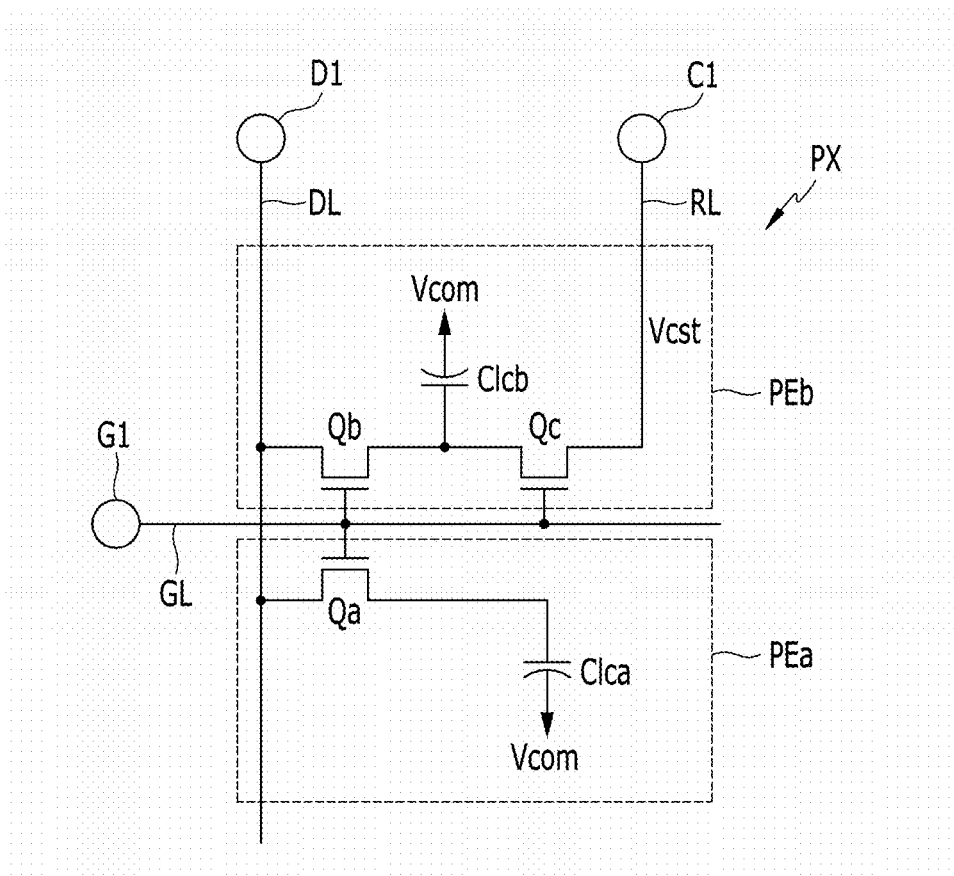
FIG. 3 illustrates an equivalent circuit diagram of an exemplary embodiment of one pixel of a lower display panel and a connection relationship of driving lines according to the invention.

FIG. 3 illustrates an equivalent circuit diagram of an exemplary embodiment of one pixel of a lower display panel and a connection relationship of driving lines according to the invention.

Referring to FIG. 1, a plurality of lower display panels 300 is disposed on a lower mother board 100. In view of an equivalent circuit, each of the lower display panels 300 includes a plurality of signal lines and a plurality of pixel areas which is connected to the signal lines and arranged approximately in a matrix. In the lower display panel 300, a gate driving line G1 which is connected to a gate line of each pixel which is located in the lower display panel 300, a data driving line D1 which is connected to the data line, and a divided reference voltage driving line C1 which is connected to a divided reference voltage line are provided.

FIG. 3 illustrates an equivalent circuit diagram of one pixel of a lower display panel 300 according to an exemplary embodiment of the invention and a connection relationship of driving lines. Referring to FIG. 3, a gate line GL of each pixel is connected to the gate driving line G1, a data line DL is connected to the data driving line D1, and a divided reference voltage line RL is connected to the divided reference voltage driving line C1.

Referring back to FIG. 1, an extension (represented by a triangle) is provided at one end of the gate driving line G1 in order to be in contact with an upper mother board 200. Similarly, an extension (represented by a quadrangle) is provided at one end of the data driving line D1 and an extension (represented by a circle) is also provided at one end of the divided reference voltage driving line C1. The extensions of the gate driving line G1, the data driving line D1 and divided reference voltage driving line C1 are represented by different shapes for the convenience of distinguishment in the drawings, but the extensions may have the same shape. In an exemplary embodiment, the extensions may have a quadrangular shape.

Short spacers 70 and 71 are disposed on the extensions of the data driving line D1 and the divided reference voltage driving line C1, respectively, to be short-circuited from the upper mother board 200. However, no short spacer is disposed on the extension of the gate driving line G1. Specific connection types of the lower display panel 300 with the gate driving line G1, the data driving line D1, and the divided reference voltage driving line C1 will be described below.

The extensions of the gate driving line G1, the data driving line D1, and the divided reference voltage driving line C1 which are connected to one lower display panel 300 on the lower mother board 100 are located at the same side of the lower display panel 300. In the illustrated exemplary embodiment, the extensions of the gate driving line G1, the data driving line D1, and the divided reference voltage driving line C1 are located in a left side of the lower display panel 300, for example. In an exemplary embodiment, the extensions of the gate driving line G1, the data driving line D1, and the divided reference voltage driving line C1 may be located to be parallel to each other on the same line.

The upper mother board 200 includes an insulation substrate (refers to FIG. 6) and a common electrode which is disposed on the insulation substrate. A plurality of upper display panels 400 is disposed on the upper mother board 200 so as to correspond to the lower display panel 300. The upper mother board 200 may be divided by a plurality of cutting lines L1, L2, and L3 during a manufacturing process of an LCD according to exemplary embodiment of the invention.

Referring FIGS. 1 and 2, the cutting lines L1 and L2 are defined first and then the cutting line L3 may be additionally defined. In the exemplary embodiment of the invention, the upper mother board 200 may be larger than the lower mother board 100. Since the upper mother board 200 is larger than the lower mother board 100, the upper mother board 200 includes a region K1 where the lower mother board 100 is not disposed below the upper mother board 200. In the region K1, voltage applying units P1 and P2 with which a probe is in contact to apply a voltage to the upper mother board 200 may be provided.

In a manufacturing method according to an exemplary embodiment of the invention, when a probe contacts the voltage applying units P1 and P2 to apply the voltage, the applied voltage is transmitted to the lower display panel 300 and the upper display panel 400 through the short spacers 70 and 71 and also transmitted to the gate line, the data line, and the divided reference voltage line of the pixel which are provided in each display panel. When the liquid crystal is aligned by the applied voltage and light is irradiated thereon from an upper plate at this time, the liquid crystal is pretilted by photo-hardening of a photo reaction material which is located between liquid crystal molecules.

Now, operations of the manufacturing method of an LCD according to the exemplary embodiment of the invention will be described.

First, the manufacturing method of an LCD according to the exemplary embodiment of the invention includes an operation of preparing a lower mother board 100 on which a plurality of lower display panels 300 each including a thin film transistor ("TFT") is provided and a lower alignment layer is applied.

In view of an equivalent circuit in FIG. 3, each of the lower display panel 300 includes a plurality of signal lines and a plurality of pixel areas which is connected to the signal lines and arranged approximately in a matrix. The signal line may include a plurality of gate lines GL which transmits a gate signal (also referred to as a "scanning signal") and a plurality of data lines DL which transmits a data voltage. In an exemplary embodiment, one pixel PX may include subpixels PEb and PEa, first, second, and third switching elements Qa, Qb, and Qc and first and second liquid crystal capacitors Clca and Clcb which are connected to the plurality of signal lines.

The first and second switching elements Qa and Qb are connected to the gate line GL and the data line DL, respectively and the third switching element Qc is connected to an output terminal of the second switching element Qb and the divided reference voltage line RL.

The first switching element Qa and the second switching element Qb are three terminal elements such as a TFT and a control terminal thereof is connected to the gate line GL, an input terminal thereof is connected to the data line DL, and an output terminal of the first switching element Qa is connected to the first liquid crystal capacitor Clca and an output terminal of the second switching element Qb is connected to the second liquid crystal capacitor Clcb and an input terminal of the third switching element Qc.

The third switching element Qc is also a three terminal element such as a TFT and a control terminal thereof is connected to the gate line GL, an input terminal is connected to the second liquid crystal capacitor Clcb, and an output terminal is connected to the divided reference voltage line RL.

Figure 4:
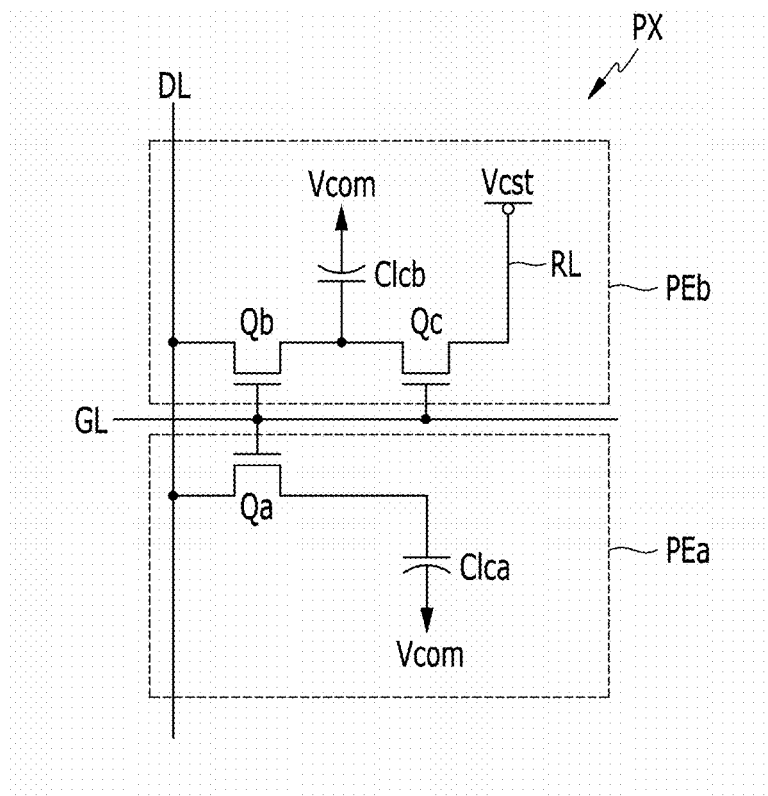
FIG. 4 is an equivalent circuit diagram of an exemplary embodiment of one pixel of an LCD according to the invention.

FIG. 4 is an equivalent circuit diagram of one pixel of an LCD according to an exemplary embodiment of the invention. The equivalent circuit illustrated in FIG. 4 may have a structure and/or a construction substantially the same as or similar to the exemplary embodiment of the equivalent circuit illustrated with reference to FIG. 3 in a simpler diagram. Thus, detailed descriptions on elements substantially the same as or similar to those illustrated in FIG. 3 are omitted Referring to FIGS. 5 and 6 together with FIG. 4, an example of a lamination structure of one pixel area of the lower display panel 300 will be described.

Figure 5:
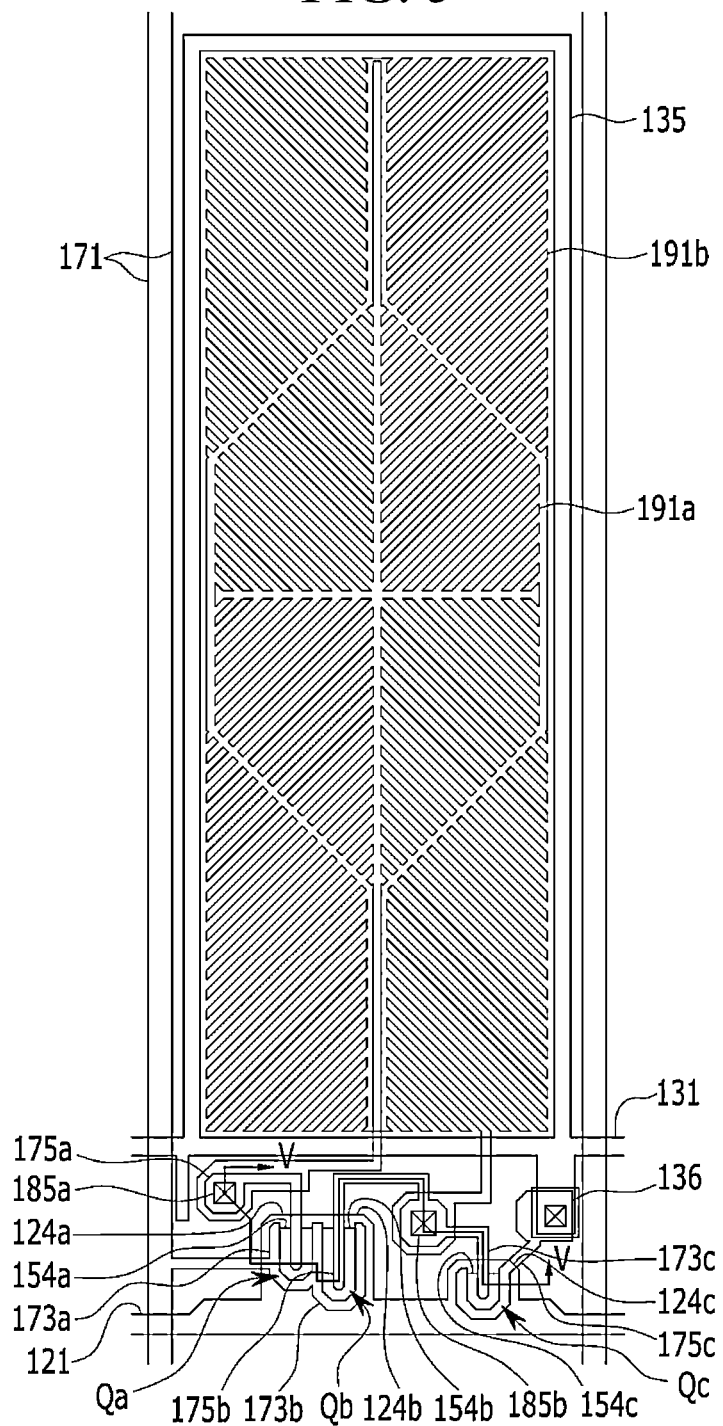
FIG. 5 is a plan view of an exemplary embodiment of one pixel of an LCD according to the invention.
Figure 6:
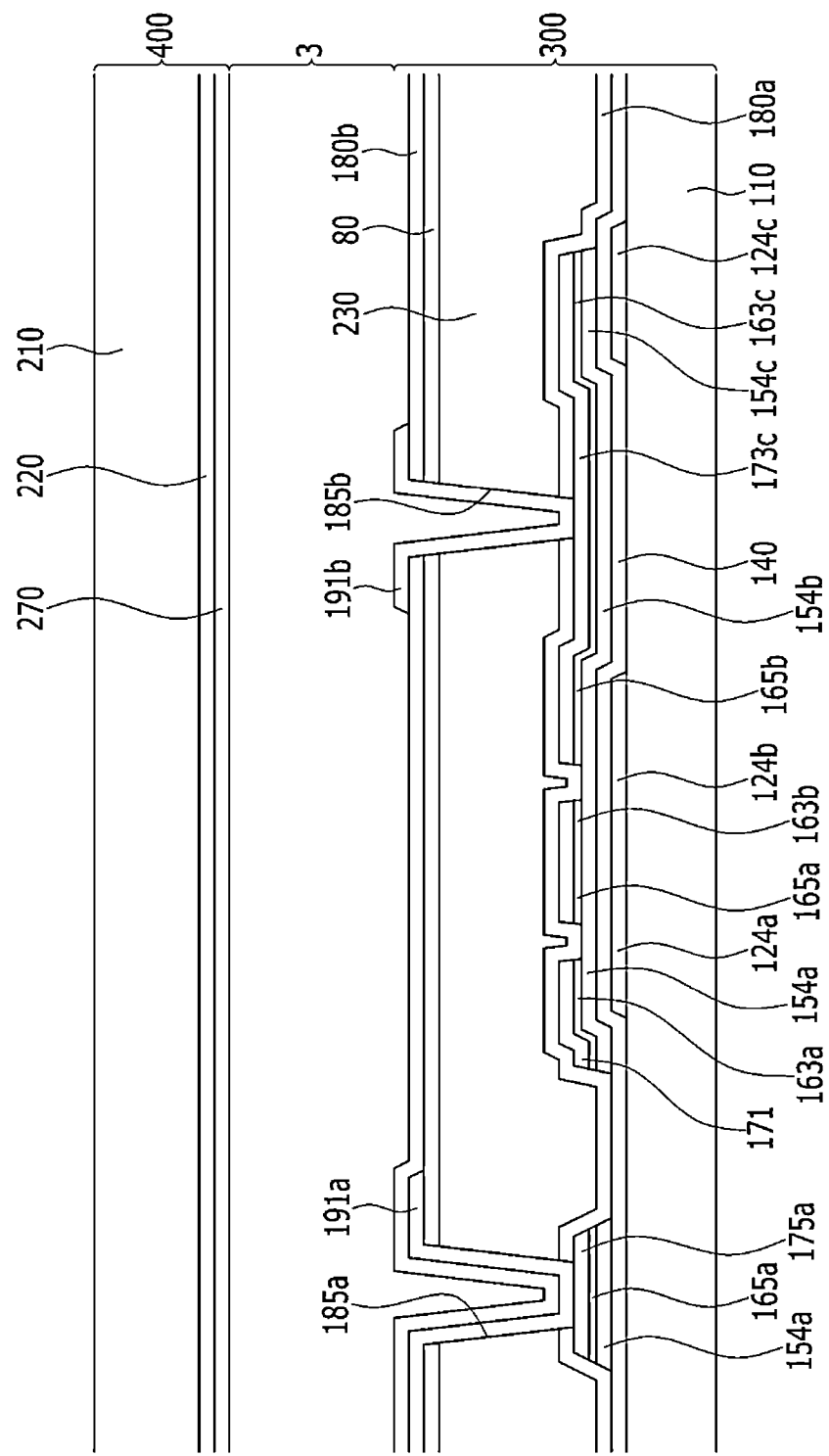
FIG. 6 is a cross-sectional view of the LCD of FIG. 5 taken along line V-V.

FIG. 5 is a plan view of an example of one pixel of an LCD according to an exemplary embodiment of the invention. FIG. 6 is a cross-sectional view of the LCD of FIG. 5 taken along line V-V.

First, the lower display panel 300 will be described.

A gate line 121, a reference voltage line 131, and a storage electrode 135 are disposed on an insulation substrate 110 which includes transparent glass or plastic. The gate line 121 extends mainly in a horizontal direction and transmits a gate signal.

The gate line 121 includes a wide end portion (not illustrated) in order to be connected with a first gate electrode 124a, a second gate electrode 124b, a third gate electrode 124c, and other layers or an external driving circuit.

The reference voltage line 131 may extend so as to be parallel to the gate line 121 and has an extension 136 which is connected to a third drain electrode 175c which will be described below.

The reference voltage line 131 includes the storage electrode 135 which encloses the pixel area.

A gate insulating layer 140 is disposed on the gate line 121, the reference voltage line 131, and the storage electrode 135.

A first semiconductor 154a, a second semiconductor 154b, and a third semiconductor 154c which may include amorphous or crystalline silicon are disposed on the gate insulating layer 140.

A plurality of ohmic contacts 163a, 163b, 163c, 165a, 165b, and 165c is disposed on the first semiconductor 154a, the second semiconductor 154b, and the third semiconductor 154c. In an exemplary embodiment, when the semiconductors 154a, 154b, and 154c are oxide semiconductors, the ohmic contact may not be provided.

A data line 171 which includes a first source electrode 173a and a second source electrode 173b and data conductors 171, 173a, 173b, 173c, 175a, 175b and 175c which include a first drain electrode 175a, a second drain electrode 175b, a third source electrode 173a and a third drain electrode 175c are disposed on the ohmic contacts 163a, 163b, 163c, 165a, 165b, 165c and the gate insulating layer 140.

The second drain electrode 175b is connected to the third source electrode 173c.

The first gate electrode 124a, the first source electrode 173a, and the first drain electrode 175a provide a first TFT Qa together with the first semiconductor 154a and a channel of the TFT is provided in a semiconductor portion 154a between the first source electrode 173a and the first drain electrode 175a. Similarly, the second gate electrode 124b, the second source electrode 173b, and the second drain electrode 175b provide a second TFT Qb together with the second semiconductor 154b and a channel of the TFT is provided in a semiconductor portion 154b between the second source electrode 173b and the second drain electrode 175b. Further, the third gate electrode 124c, the third source electrode 173c, and the third drain electrode 175c provide a third TFT Qc together with the third semiconductor 154c and a channel of the TFT is provided in a semiconductor portion 154c between the third source electrode 173c and the third drain electrode 175c.

A first passivation layer 180a which may include an inorganic insulator such as silicon nitride or silicon oxide is disposed on the data conductors 171, 173a, 173b 173c, 175a, 175b, and 175c and an exposed semiconductor portions.

A color filter 230 is disposed on the first passivation layer 180a.

A light blocking member 220 may be disposed on a region on which color filter 230 is not disposed and a part of the color filter 230. The light blocking member 220 is also referred to as a black matrix and prevents light leakage.

An overcoat (also referred to as a capping layer) 80 is disposed on the color filter 230. The overcoat 80 prevents the color filter 230 from being loosened and suppresses the contamination of the liquid crystal layer 3 due to an organic material such as a solvent which is flew-in from the color filter to prevent an error such as a residual image which may occur while a screen is driven.

A first sub-pixel electrode 191a is disposed on the overcoat 80. Referring to FIG. 5, the first sub-pixel electrode 191a includes a cross-shaped stem portion which is disposed at the center of the pixel area and a plurality of first branch electrodes which spreads out from the cross-shaped stem portion in a plan view. The first branch electrodes extend in four directions. A shape in which the first branch electrodes extend provides a planar shape including four trapezoids which enclose a cross-shaped connection portion.

A second passivation layer 180b is disposed on the overcoat 80 and the first sub-pixel electrode 191a. A second sub-pixel electrode 191b is disposed on the second passivation layer 180b.

The second sub-pixel electrode 191b encloses the first sub-pixel electrode 191a. In an exemplary embodiment, the second sub-pixel electrode 191b may have a quadrangular shape and a center thereof may have a hollow hexagonal shape in a plan view. The second sub-pixel electrode 191b includes second branch electrodes which extend from edges of the quadrangle to the center in a plan view. A shape in which the second branch electrodes extend provides four trapezoids corresponding to the trapezoids of the first sub-pixel electrode.

The first sub-pixel electrode 191a and the second sub-pixel electrode 191b may include a transparent material such as indium tin oxide ("ITO") and indium zinc oxide ("IZO"). In an exemplary embodiment, the first sub-pixel electrode 191a and the second sub-pixel electrode 191b may include a transparent conductive material such as ITO or IZO or a reflective metal such as aluminum, silver, chromium or an alloy thereof, for example.

A first contact hole 185a which exposes a part of the first drain electrode 175a is defined in the first passivation layer 180a and the overcoat 80 and a second contact hole 185b which exposes a part of the second drain electrode 175b is provided in the first passivation layer 180a, the overcoat 80 and the second passivation layer 180b.

The first sub-pixel electrode 191a is physically and electrically connected to the first drain electrode 175a through the first contact hole 185a and the second sub-pixel electrode 191b is physically and electrically connected to the second drain electrode 175b through the second contact hole 185b.

The data voltage is applied to the first sub-pixel electrode 191a and the second sub-pixel electrode 191b from the first drain electrode 175a and the second drain electrode 175b, respectively through the first contact hole 185a and the second contact hole 185b.

In this case, a part of the data voltage which is applied to the second drain electrode 175b is divided through the third source electrode 173c so that the voltage which is applied to the first sub-pixel electrode 191a is higher than the voltage which is applied to the second sub-pixel electrode 191b.

The first sub-pixel electrode 191a and the second sub-pixel electrode 191b to which the data voltage is applied generate an electric field together with the common electrode 270 of the upper display panel 400 so that a direction of the liquid crystal molecules of the liquid crystal layer 3 between the two electrodes 191 and 270 is determined Luminance of the light which passes through the liquid crystal layer 3 varies depending on the direction of the liquid crystal molecule determined as described above.

A lower alignment layer (not illustrated) is disposed on the first sub-pixel electrode 191a and the second sub-pixel electrode 191b. In an exemplary embodiment, the lower alignment layer may include a vertical alignment layer or a horizontal alignment layer. The lower alignment layer may include an alignment supplement for initial alignment of the liquid crystal. The alignment supplement may include a reactive monomer and may include an ultraviolet ("UV") curable monomer, for example. In an exemplary embodiment, the lower alignment layer may also further include an UV curing initiator. In an exemplary embodiment, the ultraviolet curable monomer may include an acrylate based monomer, for example, and the UV curing initiator may include a material which may be absorbed into an ultraviolet ray region and may include 2,2-dimethoxy-1,2-diphenyl ethanone, for example.

A plurality of pixels having the lamination structure as described above is disposed on the lower display panel 300.

Figure 7:
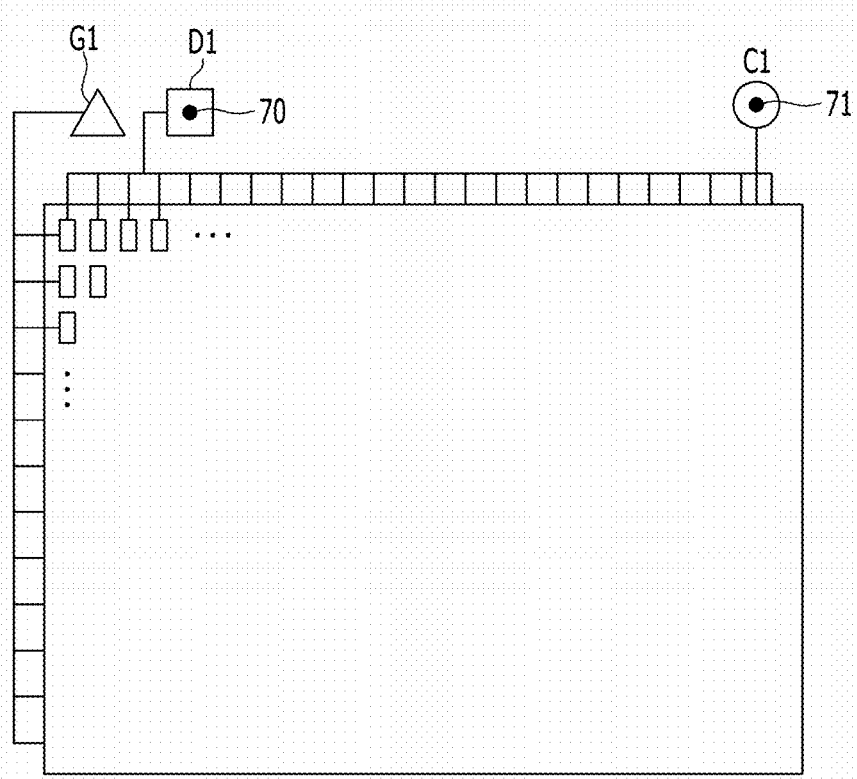
FIG. 7 illustrates an exemplary embodiment of a connection relationship of a gate line, a data line, and a divided reference voltage line of each pixel in one lower display panel of a mother board assembly according to the invention.

FIG. 7 illustrates a connection relationship of a gate line, a data line, and a divided reference voltage line of each pixel in one lower display panel 300 of a mother board assembly according to an exemplary embodiment of the invention.

Referring to FIG. 7, the gate line, the data line, and the divided reference voltage line of each pixel extend outside the pixel and are disposed at one side thereof Referring to FIG. 7, the gate lines which are connected to each pixel extend outside the pixel so as to be connected to each other at one side of the lower display panel 300 and connected to the gate driving line G1. The data lines which are connected to each pixel also extend outside the pixel so as to be connected to each other at one side of the lower display panel 300 and connected to the data driving line D1.

The divide reference voltage lines which are connected to each pixel also extend outside the pixel so as to be connected at one side of the lower display panel 300 to each other and connected to the divided reference voltage driving line C1. Extensions are provided at one ends of the gate driving line G1, the data driving line D1, and the divided reference voltage driving line C1.

Short spacers 70 and 71 are provided in the extension of the data driving line D1 and the extension of the divided reference voltage driving line C1, respectively, in order to be in contact with the upper mother board 200 later. The short spacer 70 brings the upper mother board 200 into contact with the data driving line D1 and when a voltage is applied to the upper mother board 200 later, the voltage is applied through the short spacer 70 to apply the voltage to the data line DL of each pixel. Similarly, the short spacer 71 brings the upper mother board 200 into contact with the divided reference voltage line C1 and when a voltage is applied to the upper mother board 200 later, the voltage is applied through the short spacer 71 to apply the voltage to the divided reference voltage line C1 of each pixel.

Extensions of the gate driving line G1, the data driving line D1, and the divided reference voltage driving line C1 which are provided at one side of the lower display panel 300 may be disposed on the same side of the lower display panel 300. The extensions of the gate driving line G1, the data driving line D1, and the divided reference voltage driving line C1 are provided outside the lower display panel 300 and on the lower mother board 100 and cut and removed during a process of cutting the display panel into individual liquid crystal panels.

Next, an upper mother board 200 on which a plurality of upper display panels 400 corresponding to the plurality of lower display panels 300 is provided and an upper alignment layer is applied is prepared.

The upper display panel 400 includes a plurality of pixel areas corresponding to a plurality of pixel areas of the lower display panel 300. The corresponding pixel areas of the lower display panel 300 and the upper display panel 400 provide one pixel PX which is a unit of displaying an image.

The upper mother board 200 may include an insulation substrate 210, a common electrode 270 which is provided above the insulation substrate 210, and an upper alignment layer which is disposed on the common electrode. The upper alignment layer may be a vertical alignment layer or a horizontal alignment layer. The upper alignment layer may include an alignment supplement for initial alignment of the liquid crystal. The alignment supplement may be a reactive monomer and may include an ultraviolet curable monomer, for example. In an exemplary embodiment, the upper alignment layer may further include an UV curing initiator, for example. In an exemplary embodiment, the ultraviolet curable monomer may be an acrylate based monomer and the UV curing initiator may include a material which may be absorbed into an ultraviolet ray region and may include 2,2-dimethoxy-1,2-diphenyl ethanone, for example.

The upper mother board 200 is larger than the lower mother board 100. Referring to FIGS. 1 and 2, the upper mother board 200 is larger than the lower mother board 100 so that a region where the upper mother board 200 does not face the lower mother board 100 is denoted by K1. The region K1 may be located on only one side of four sides of the upper mother board 200, or upper and lower sides, or all four sides.

Referring to FIGS. 1 and 2, the upper mother board 200 may be divided into regions A1, A2, and A3 which are divided by cutting lines L1, L2, and L3 which are defined in the upper mother board 200 in later operations. In this case, the regions A1 and A2 may respectively include voltage applying units P1 and P2 which are provided at one end of the region K1 where the upper mother board 200 does not face the lower mother board 100, respectively. In the later operations, the voltage may be applied to the first region A1 of the upper mother board 200 through the voltage applying unit P1 and to the second region A2 of the upper mother board 200 through the voltage applying unit P2. However, the upper mother board 200 may not include the voltage applying units P1 and P2 and the voltage may be directly applied to the upper mother board 200 without passing through the voltage applying unit.

Next, a liquid crystal combination layer including a liquid crystal is provided between the upper mother board 200 and the lower mother board 100 and the upper mother board 200 and the lower mother board 100 are combined to provide a mother board assembly.

In an exemplary embodiment, the liquid crystal may have dielectric anisotropy. The liquid crystal combination may further include an alignment supplement. The alignment supplement may be a reactive monomer and for example, may include an ultraviolet curable monomer. In an exemplary embodiment, the liquid crystal combination may also further include an UV curing initiator. The ultraviolet curable monomer may be an acrylate based monomer and the UV curing initiator may include a material which may be absorbed into an ultraviolet ray region and may include 2,2-dimethoxy-1, 2-diphenyl ethanone, for example.

Figure 8:
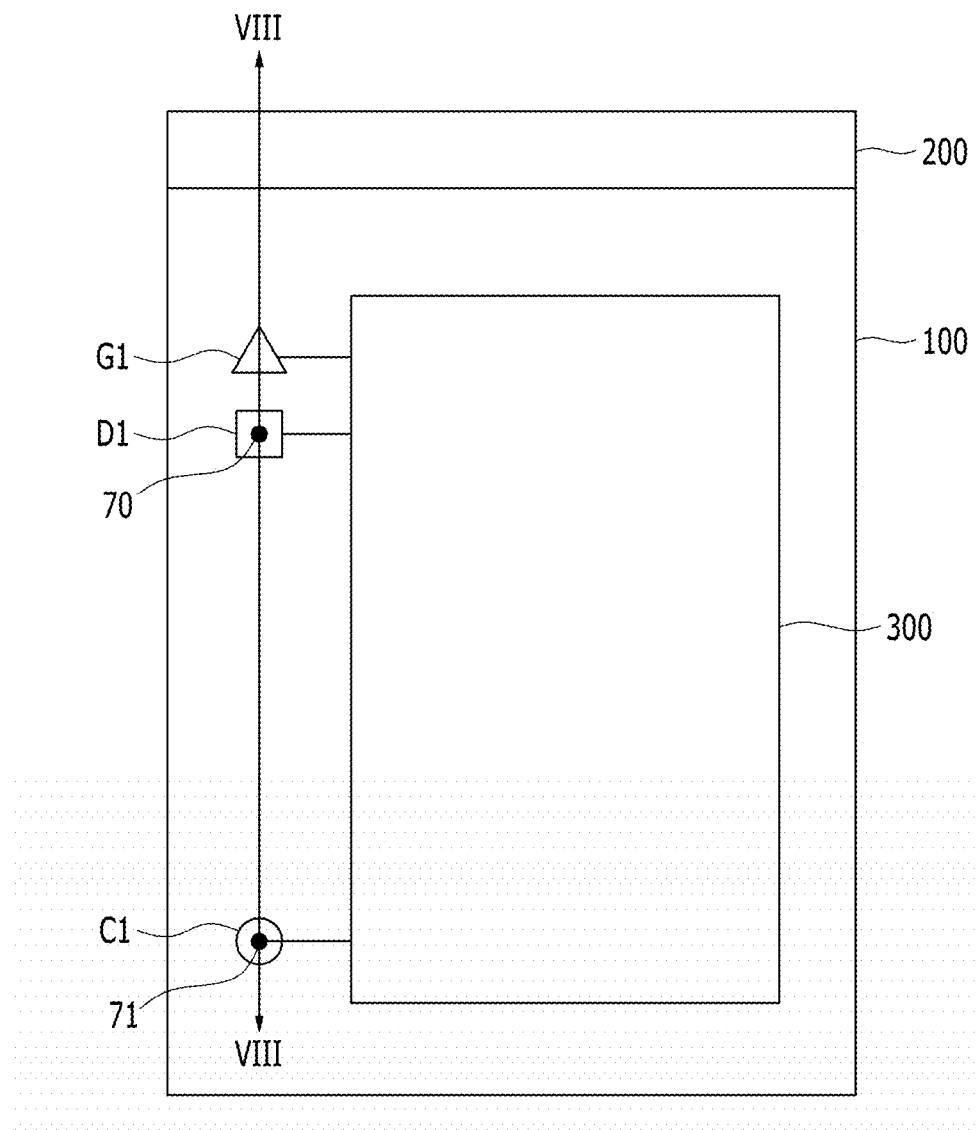
FIG. 8 illustrates an exemplary embodiment of a mother board assembly according to the invention.
Figure 9:
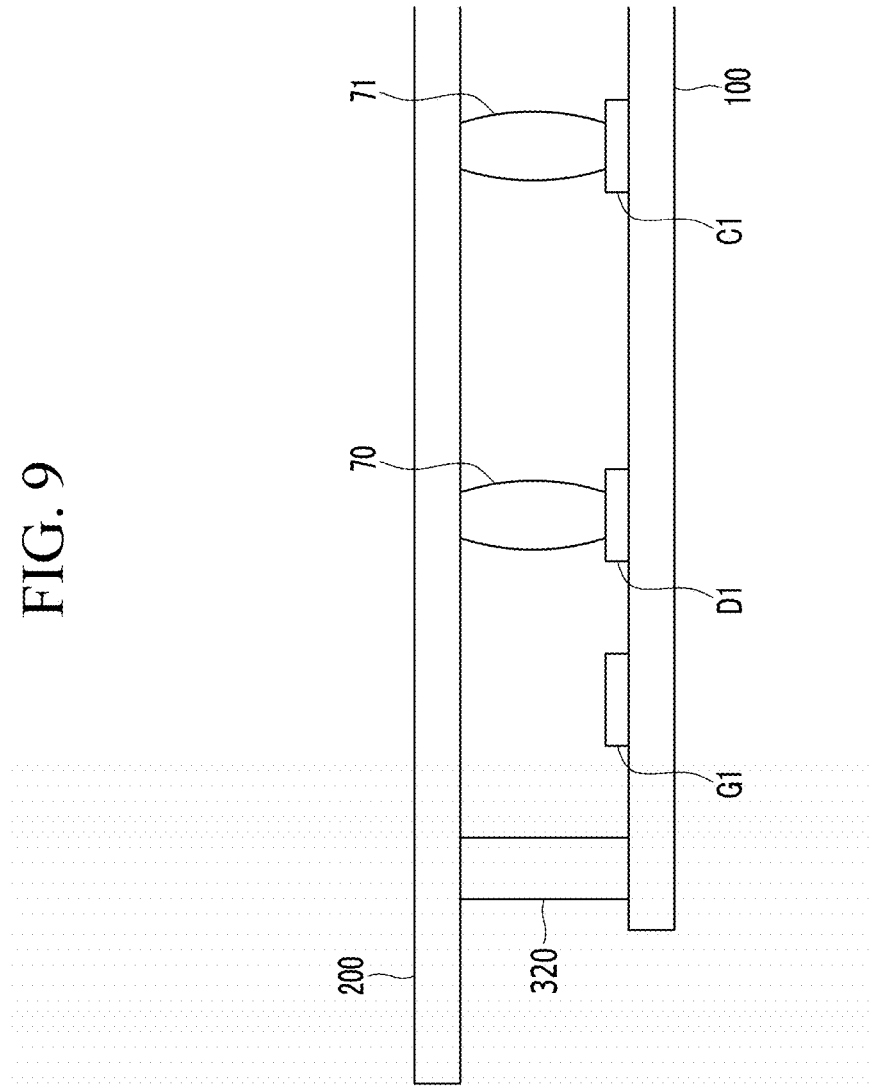
FIG. 9 is a cross-sectional view taken along line VIII-VIII of FIG. 8.

FIG. 8 illustrates a mother board assembly according to an exemplary embodiment of the invention. FIG. 9 is a cross-sectional view taken along line VIII-VIII of FIG. 8.

Referring to FIG. 9, the upper mother board 200 and the lower mother board 100 are sealed by a sealant 320. Since the upper mother board 200 is larger than the lower mother board 100, a part of the upper mother board 200 does not correspond to the lower mother board 100 to be exposed. That is, the part of the upper mother board 200 is located at an outer border located outside a position where the sealant 320 is provided. The short spacers 70 and 71 which are disposed on the extensions of the data driving line D1 and the divided reference voltage driving line C1 of the lower mother board 100 bring the extensions of the data driving line D1 and the divided reference voltage driving line C1 into contact with the upper mother board 200.

Accordingly, in the mother board assembly, the data driving line D1 on the lower mother board 100 is in contact with the upper mother board 200 through the short spacer 70 and the divided reference voltage driving line C1 is in contact with the upper mother board 200 through the short spacer 71.

Next, the upper mother board 200 is cut to be divided into two regions per upper display panel 400. In an exemplary embodiment, the division may be performed by cutting the upper mother board 200 using a laser, for example. In an alternative exemplary embodiment, the upper mother board 200 may be cut by a method other than laser. For the sake of convenience, the divided regions are referred to as a first region and a second region.

Figure 10:
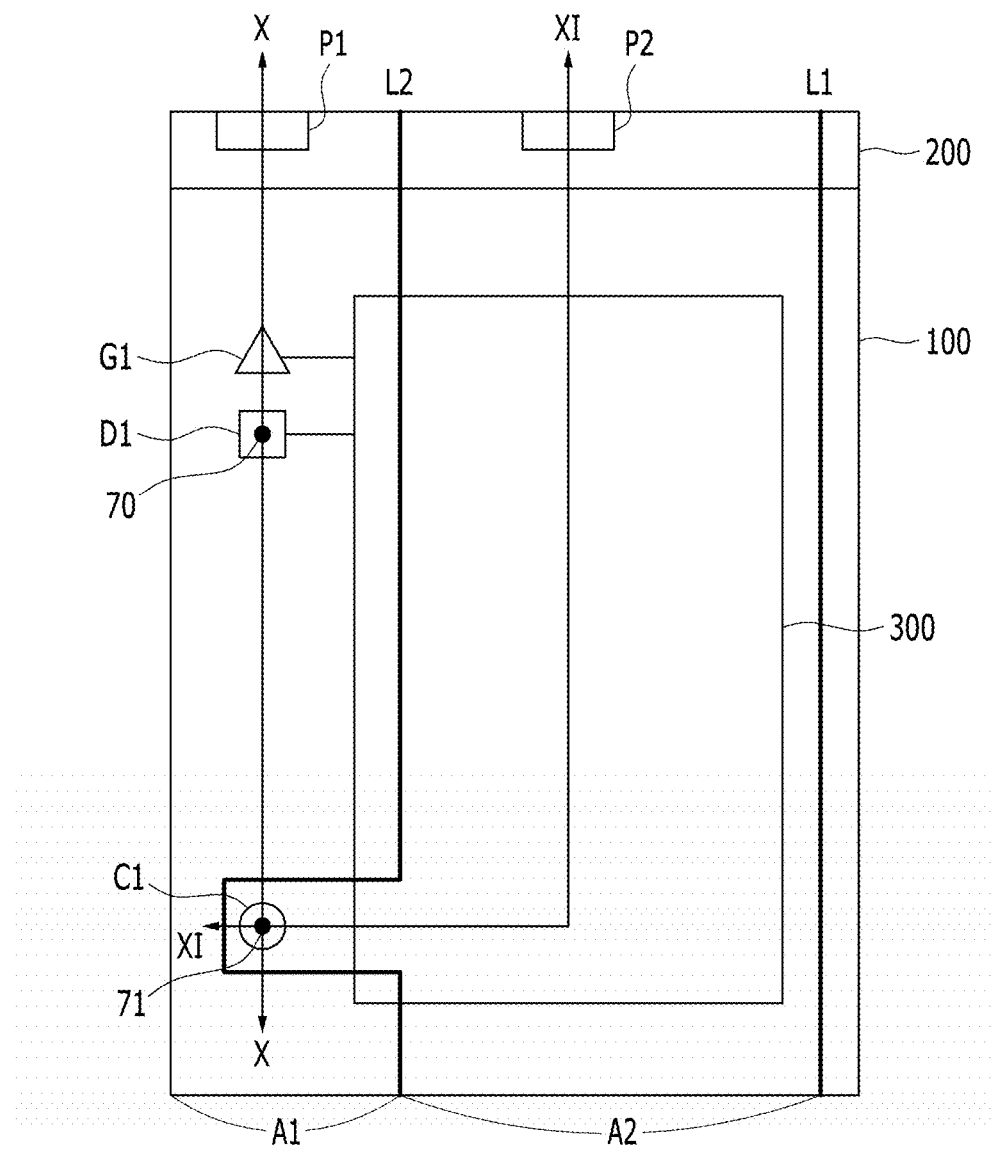
FIG. 10 illustrates a mother board assembly in which two cutting lines are defined in an exemplary embodiment of the invention.
Figure 11:
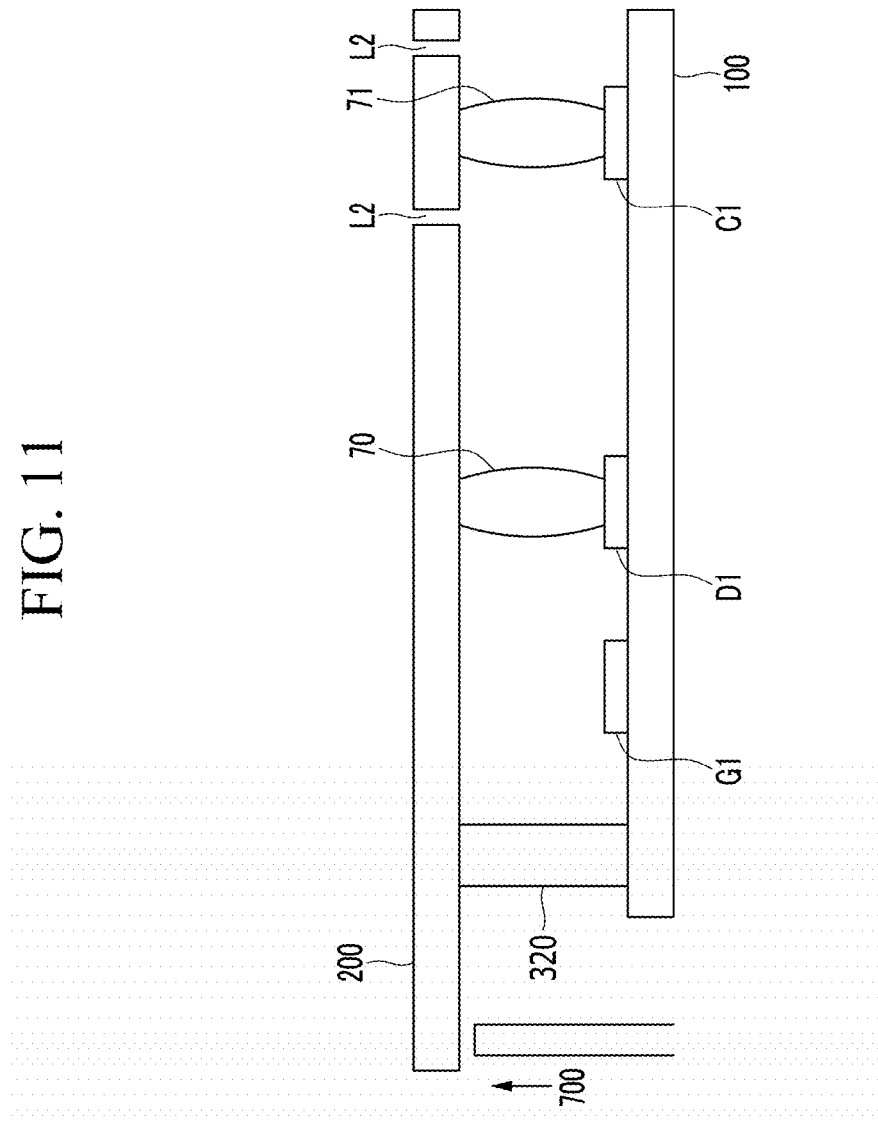
FIG. 11 is a cross-sectional view of the mother board assembly of FIG. 10 taken along line X-X.
Figure 12:
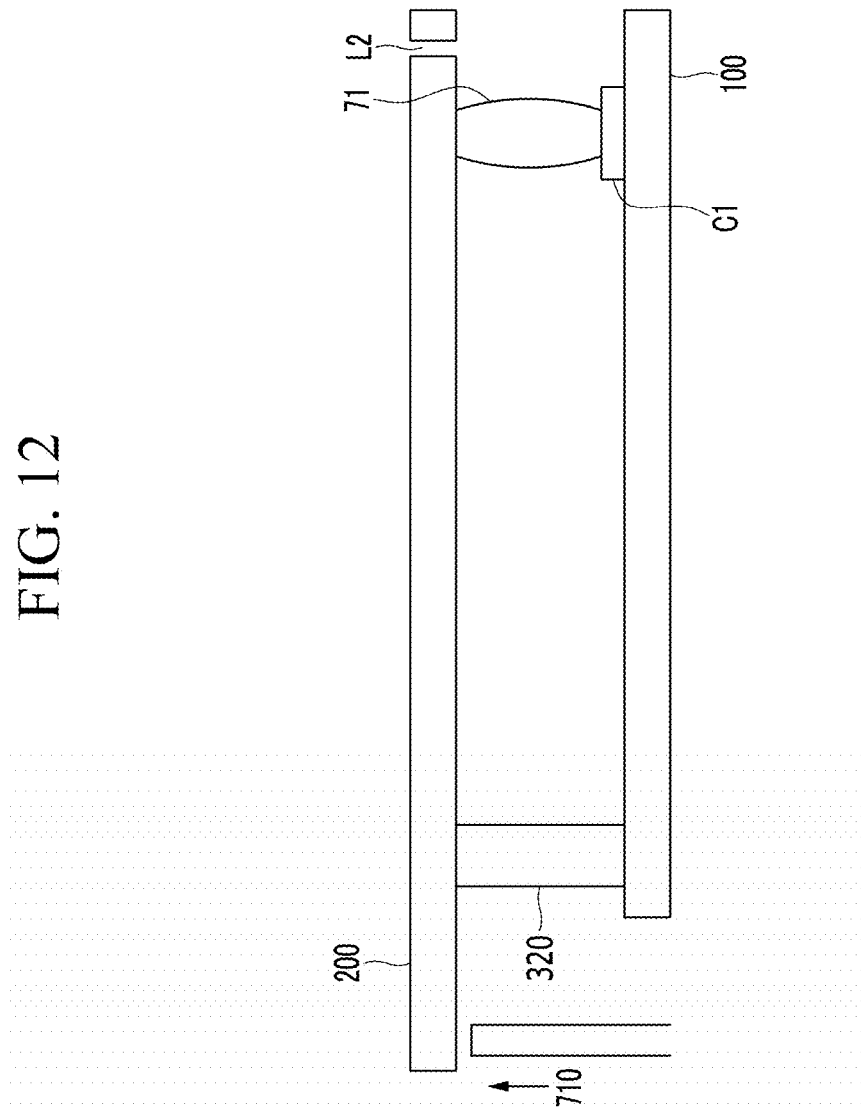
FIG. 12 is a cross-sectional view of the mother board assembly of FIG. 10 taken along line XI-XI.

FIG. 10 illustrates a mother board assembly in which two cutting lines are defined in an exemplary embodiment of the invention. FIG. 11 is a cross-sectional view of the mother board assembly of FIG. 10 taken along line X-X. FIG. 12 is a cross-sectional view of the mother board assembly of FIG. 10 taken along line XI-XI.

Referring to FIG. 10, the cutting line L1 is defined between adjacent upper display panels 400 to separate an upper display panel 400 from an adjacent upper display panel 400. The cutting line L2 is defined to vertically traverse the upper display panel 400 and has a protrusion which protrudes from a center to the outside of a region of the upper display panel 400. The cutting line L2 includes the extension of the divided reference voltage line C1 in an inner region of the cutting line L2 through the protrusion and then vertically extends again in a plan view. That is, the extension of the divided reference voltage line C1 is included in the second region A2 by the cutting line L2. The extensions of the gate driving line G1 and the data driving line D1 are disposed in the first region A1.

FIG. 11 is a cross-sectional view of the mother board assembly of FIG. 10 taken along line X-X. Referring to FIG. 11, the data driving line D1 on the lower mother board 100 is in contact with the upper mother board 200 through the short spacer 70 and the divided reference voltage driving line C1 is in contact with the upper mother board 200 through the short spacer 71.

However, the extension of the divided reference voltage driving line C1 and the short spacer 71 are separated from the data driving line D1 and the short spacer 70 through the cutting line L2 defined through the upper mother board 200.

FIG. 12 is a cross-sectional view of the mother board assembly of FIG. 10 taken along line XI-XI. Referring to FIG. 12, the divided reference voltage driving line C1 on the lower mother board 100 is in contact with the upper mother board 200 through the short spacer 71.

Next, a voltage is applied to the first region and the second region of the upper mother board, which is not covered by the lower mother board 100 to be exposed, to pretilt the liquid crystal.

Referring to FIGS. 10 to 12, voltage applying probes 700 and 710 are used to apply a liquid crystal pretilting voltage through the voltage applying unit P1 of the first region A1 and the voltage applying unit P2 of the second region A2, respectively. However, the voltage may be directly applied to the upper mother board 200 without using the voltage applying unit.

Magnitudes of the voltages which are applied to the first region A1 and the second region A2 may be different from each other. In an exemplary embodiment, the voltage which is applied to the first region A1 is a ground voltage (i.e., 0 volt (V)) and the voltage which is applied to the second region A2 may be about −9.5 V. In an alternative exemplary embodiment, the voltage which is applied to the second region A2 may be about 9.5 V. For the purpose of texture control, a voltage of about −9.5 V may be applied.

Referring to FIG. 11, the voltage which is applied to the first region A1 is transmitted along the upper mother board 200. Referring to FIG. 11, when the voltage is applied through the voltage applying probe 700 to the upper mother board 200, the applied voltage is transmitted to the data driving line D1 on the lower mother board 100 through the short spacer 70 which connects the upper mother board 200 with the lower mother board 100. The data driving line D1 which receives the voltage transmits the voltage to the gate line GL of each pixel of the lower display panel 300.

However, referring to FIGS. 10 and 11, the divided reference voltage driving line C1 is separated from the first region A1 by the cutting line L2, so that the ground voltage which is applied to the first region A1 is not transmitted to the divided reference voltage driving line C1.

Referring to FIG. 12, the voltage which is applied through the voltage applying probe 710 to the second region A2 of the upper mother board 200 is transmitted to the common electrode of the upper display panel 400 of the upper mother board 200. Further, as illustrated in FIG. 12, the voltage which is applied to the upper mother board 200 is transmitted to the divided reference voltage driving line C1 through the short spacer 71. The divided reference voltage driving line C1 to which the voltage is applied transmits the voltage to the divided reference voltage line RL of each pixel.

Figure 13:
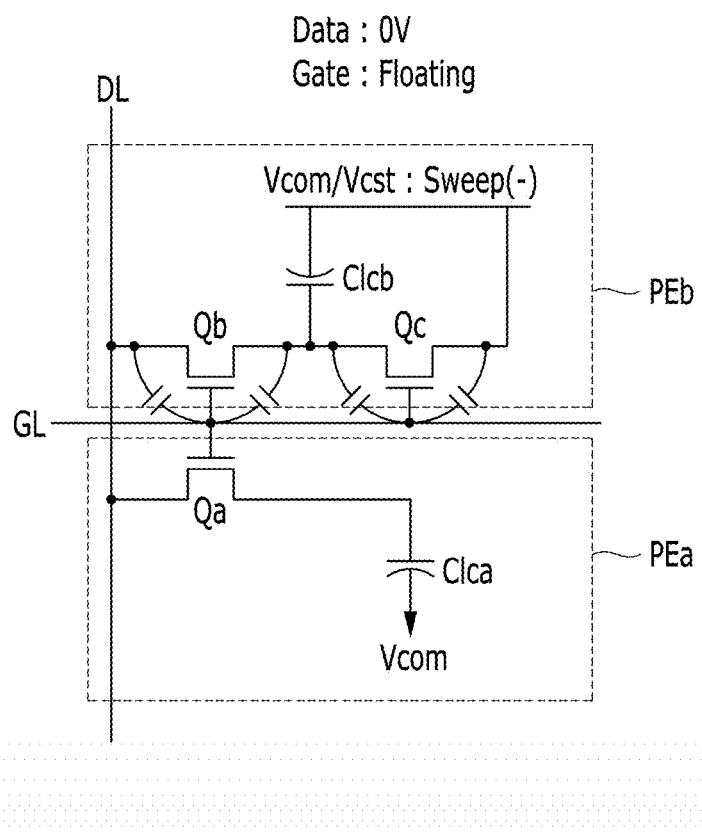
FIG. 13 is an equivalent circuit diagram of one pixel of the mother board assembly when a voltage is applied.

FIG. 13 is an equivalent circuit diagram of one pixel of the mother board assembly when a voltage is applied. Referring to FIG. 13, no short spacer is provided in the gate driving line G1 so that no voltage is applied thereto. Therefore, the gate line GL of the pixel is floated. The data driving line receives the ground voltage which is applied to the first region A1 of the mother board assembly so that a voltage of 0 V is applied to the data line DL of the pixel. Similar to the common electrode, the voltage which is applied to the second region A2 is transmitted to the divided reference voltage line RL so that the common electrode Vcom and the divided reference voltage line Vcst are swept.

Therefore, an electric field is provided only in the first sub-pixel electrode region PEa by applying the voltage.

Next, light is irradiated from an upper side of the upper mother board 200 to harden the alignment supplement.

When the alignment supplement is an ultraviolet curable monomer, light such as ultraviolet rays may be irradiated onto the liquid crystal layer in order to harden the alignment supplement. As described above, the alignment supplement may be included in at least any one of the lower alignment layer and the upper alignment layer. In an alternative exemplary embodiment, the alignment supplement may be included in the liquid crystal combination layer which is disposed between the upper display panel 400 and the lower display panel 300.

Figure 15:
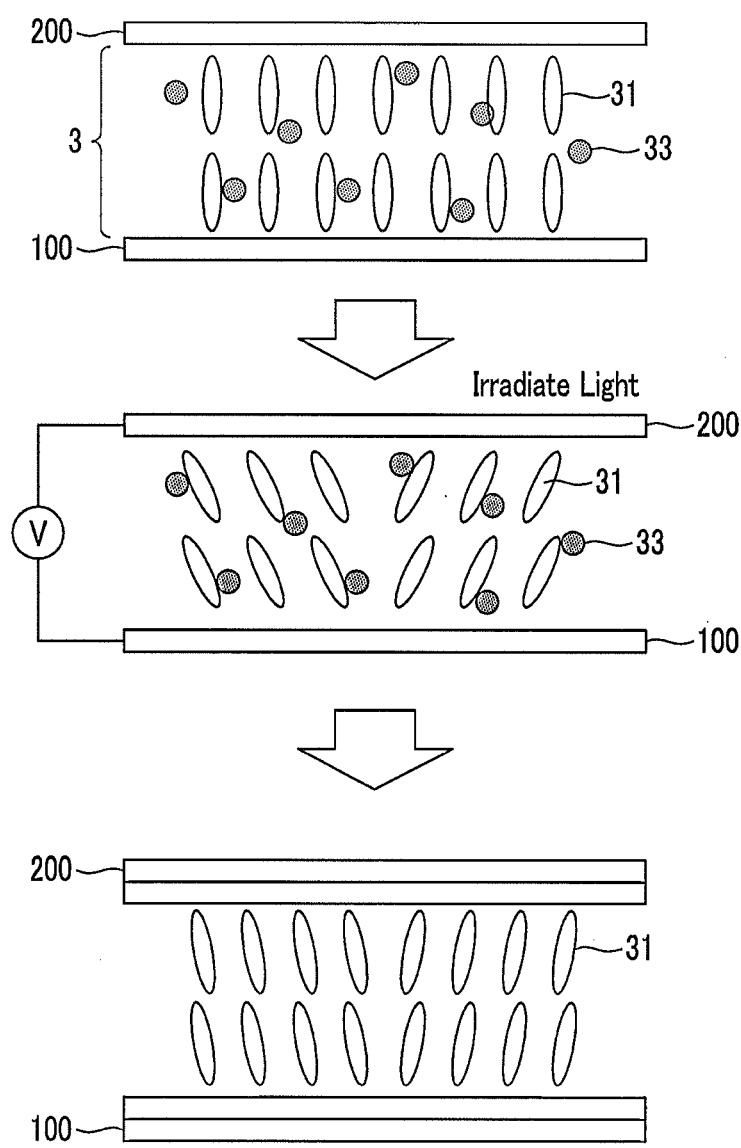
FIG. 15 illustrates an exemplary embodiment of a voltage application operation and a light irradiation operation of the LCD manufacturing process according to the invention.

FIG. 15 illustrates a voltage application operation and a light irradiation operation of the LCD manufacturing process according to an exemplary embodiment of the invention. Referring to FIG. 15, the liquid crystal molecule 31 is aligned so as to be pretilted by applying a voltage and the light is irradiated onto the aligned liquid crystal molecule to be pretilted. In this case, the alignment supplement 33 is hardened by irradiating the light so that the pretilt may be provided.

Figure 14:
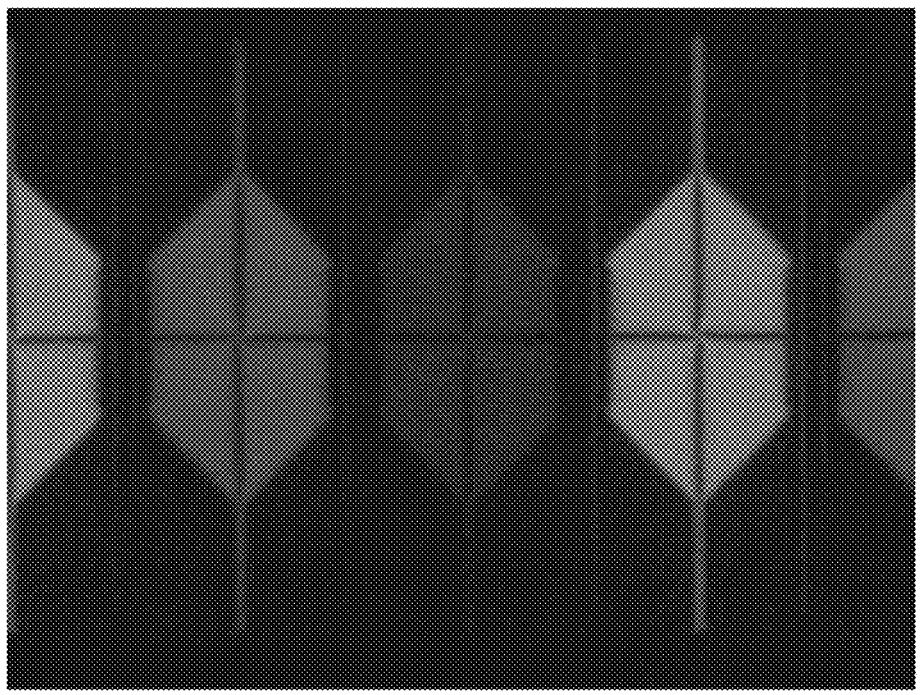
FIG. 14 is an image of a pixel to which a voltage is applied.

As described above, the electric field is provided only in the first sub-pixel electrode region PEa by applying a voltage so that a region where the liquid crystal molecule is aligned is the first sub-pixel electrode 191a. FIG. 14 is an image of a pixel to which a voltage is applied. As illustrated in FIG. 14, the electric field is provided only in the first sub-pixel electrode 191a. Therefore, the liquid crystal molecule is aligned only in the first sub-pixel electrode 191a and when the light is irradiated, the liquid crystal molecule is pretilted only in the first sub-pixel electrode 191a region.

Figure 16:
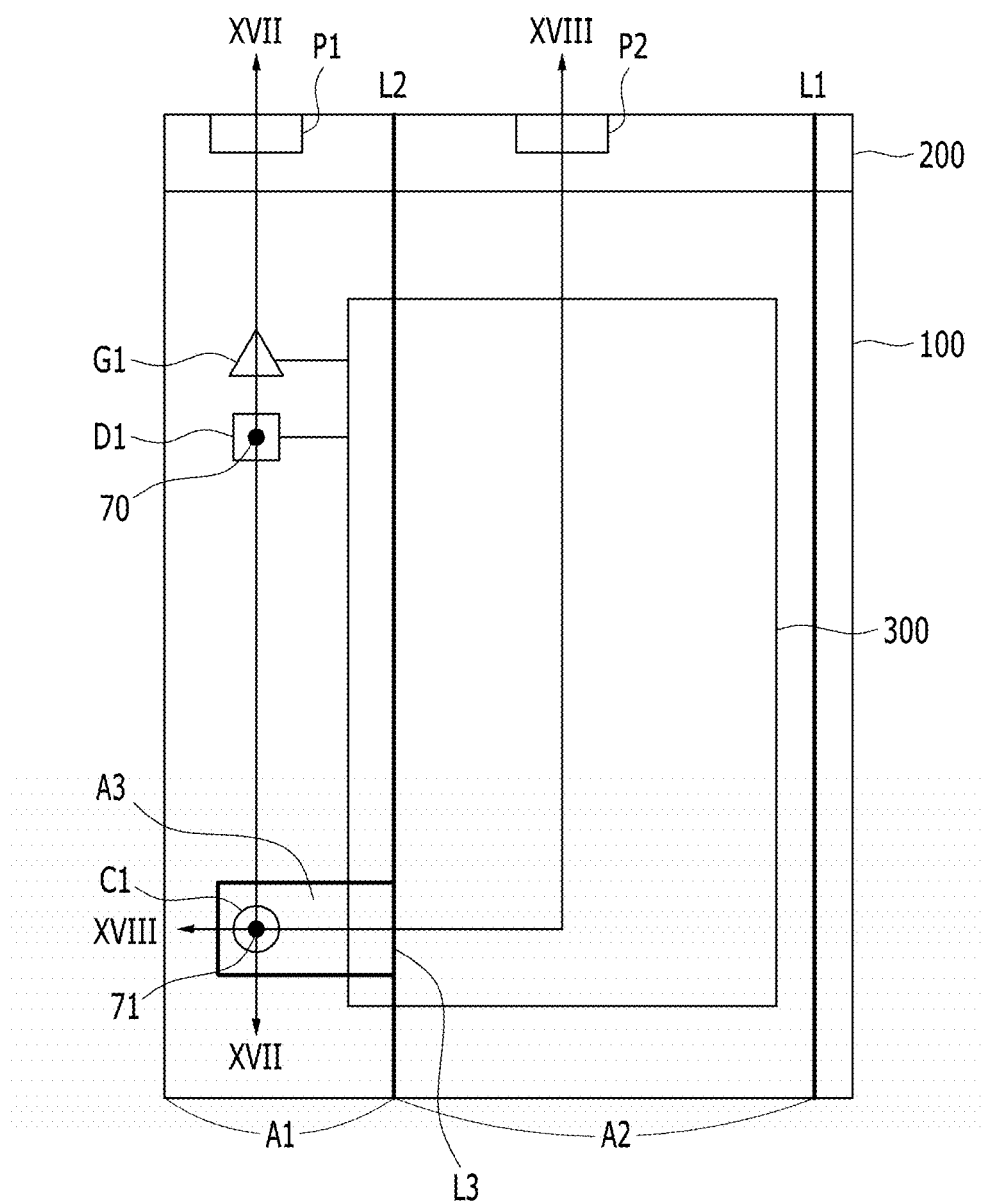
FIG. 16 illustrates a mother board assembly in which an additional cutting line is defined.
Figure 17:
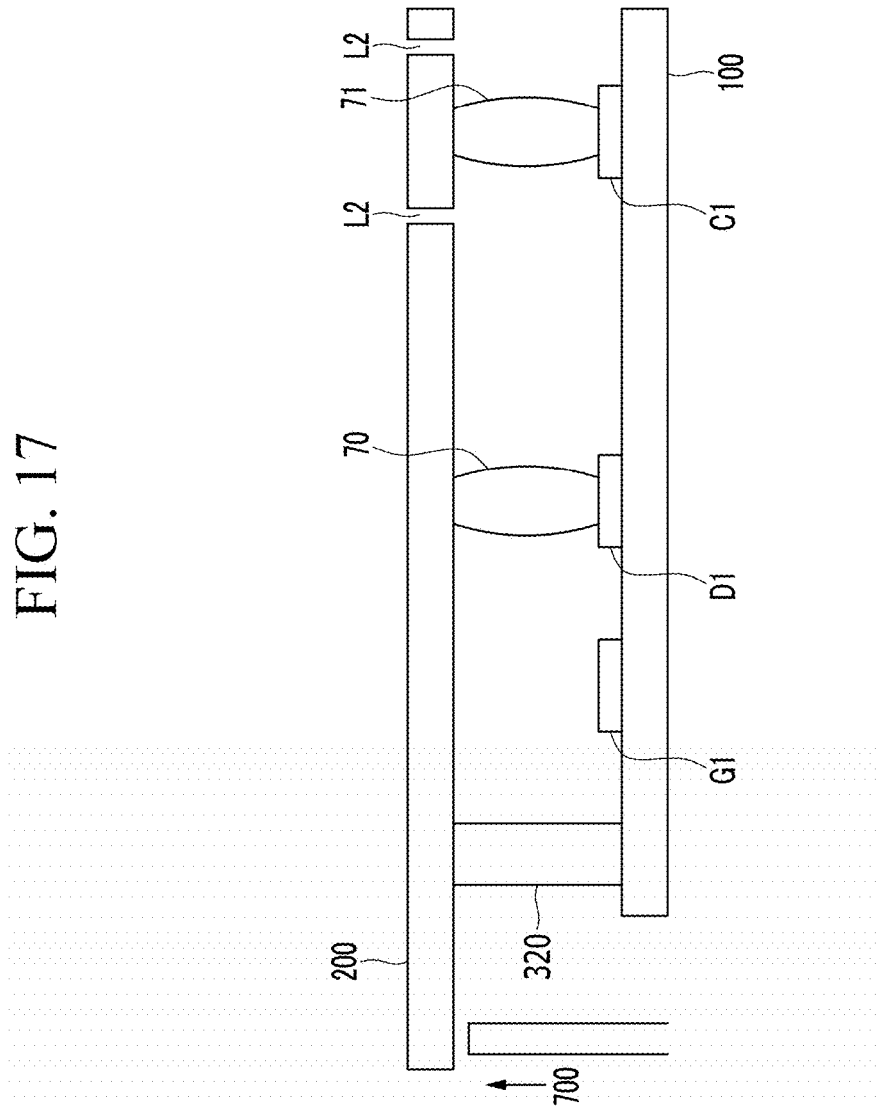
FIG. 17 is a cross-sectional view of the mother board assembly of FIG. 16 taken along line XVII-XVII.
Figure 18:
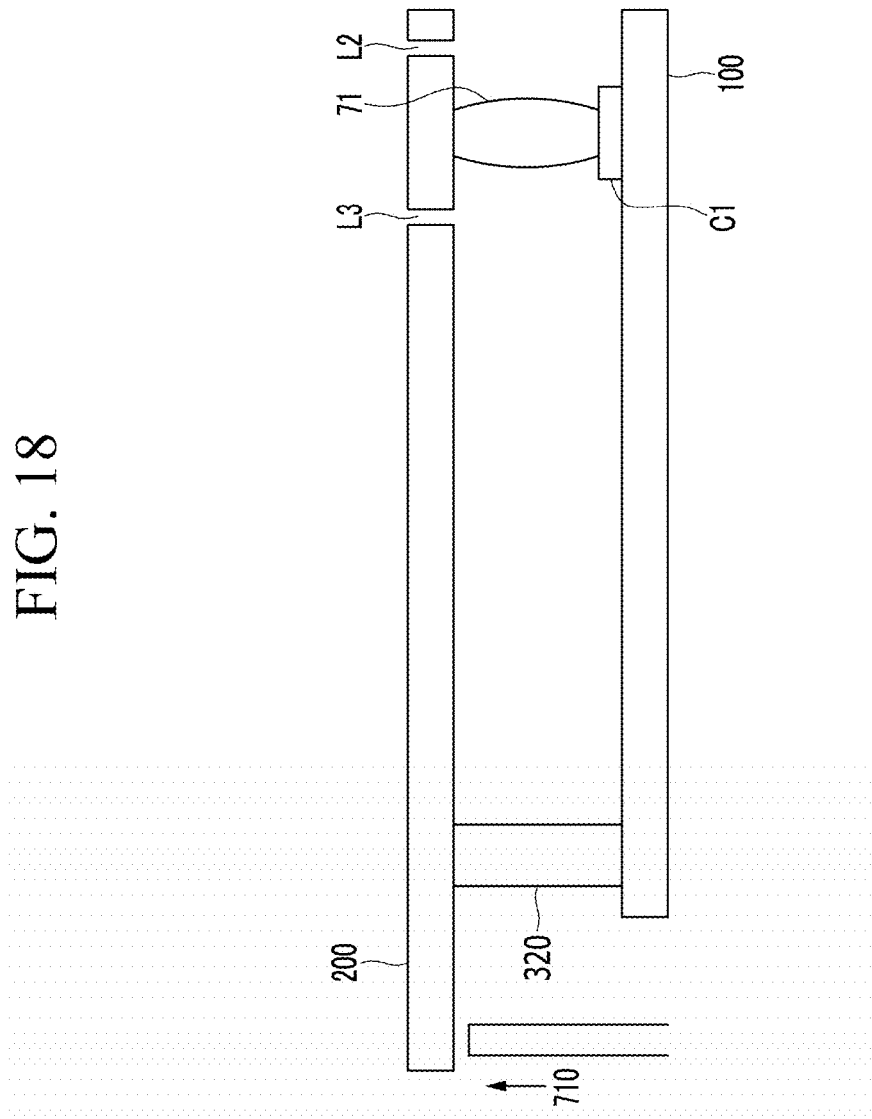
FIG. 18 is a cross-sectional view of the mother board assembly of FIG. 16 taken along line XVIII-XVIII.

Next, an additional cutting line of the upper mother board 200 is defined to separate the mother board assembly on which the divided reference voltage driving line is disposed. FIG. 16 illustrates a mother board assembly in which an additional cutting line L3 is defined. FIG. 17 is a cross-sectional view of the mother board assembly of FIG. 16 taken along line XVII-XVII. FIG. 18 is a cross-sectional view of the mother board assembly of FIG. 16 taken along line XVIII-XVIII.

Referring to FIG. 16, a third cutting line L3 is defined to match a vertical extension direction of the second cutting line L2. That is, a starting point and an ending point of the protrusion of the second cutting line L2 are connected to define the third cutting line L3 and when the third cutting line is defined, the protrusion is separated. The protrusion which is separated by the third cutting line is represented as a third region A3.

FIG. 17 is a cross-sectional view of the mother board assembly of FIG. 16 taken along the line XVII-XVII. Referring to FIG. 17, the data driving line D1 on the lower mother board 100 is in contact with the upper mother board 200 through the short spacer 70 and the divided reference voltage driving line C1 is in contact with the upper mother board 200 through the short spacer 71.

However, the extension of the divided reference voltage driving line C1 and the short spacer 71 are separated from the data driving line D1 and the short spacer 70 by the cutting line L2 defined through the upper mother board 200.

FIG. 18 is a cross-sectional view of the mother board assembly of FIG. 16 taken along the line XVIII-XVIII. Referring to FIG. 18, the extension of the divided reference voltage driving line C1 on the lower mother board 100 and the short spacer 71 are separated from the upper mother board 200 by the cutting lines L3 and L2 defined through the upper mother board 200.

Next, a voltage is applied to the first region and the second region of the upper mother board 200 which are not covered by the lower mother board 100 to be exposed to pretilt the liquid crystal.

Referring to FIGS. 16 to 18, voltage applying probes 700 and 710 are used to apply a liquid crystal pretilting voltage through the voltage applying unit P1 of the first region A1 and the voltage applying unit P2 of the second region A2. However, the voltage may be directly applied to the upper mother board 200 without using the voltage applying unit.

The magnitudes of the voltages which are applied to the first region A1 and the second region A2 may be different from each other.

In an exemplary embodiment, the voltage which is applied to the first region A1 is a ground voltage (i.e., 0 V) and the voltage which is applied to the second region A2 may be −9.5 V. In an alternative exemplary embodiment, the voltage which is applied to the second region A2 may be about 9.5 V. For the purpose of texture control, a voltage of about −9.5 V may be applied.

Referring to FIG. 17, the voltage which is applied to the first region A1 is transmitted along the upper mother board 200. Referring to FIG. 17, when the voltage is applied through the voltage applying probe 700 to the upper mother board 200, the applied voltage is transmitted to the data driving line D1 on the lower mother board through the short spacer 70 which connects the upper mother board 200 with the lower mother board 100. The data driving line D1 which receives the voltage transmits the voltage to the gate line GL of each pixel of the lower display panel 300.

However, referring to FIGS. 16 and 17, the divided reference voltage driving line C1 is separated from the first region A1 by the cutting line L2, so that the ground voltage which is applied to the first region A1 is not transmitted to the divided reference voltage driving line C1.

Referring to FIG. 18, the voltage which is applied through the voltage applying probe 710 to the second region A2 of the upper mother board 200 is transmitted to the common electrode 270 of the upper display panel 400 of the upper mother board 200. However, referring to FIG. 18, the divided reference voltage driving line C1 is separated from the second region A2 by the cutting lines L3 and L2 so that the voltage which is applied to the second region A2 is not transmitted to the divided reference voltage driving line C1.

That is, when the third cutting line L3 is defined, the divided reference voltage driving line is separated from both the first region A1 and the second region A2 and thus the voltage which is applied to the first region A1 and the second region A2 is not transmitted to the divided reference voltage driving line.

Figure 19:
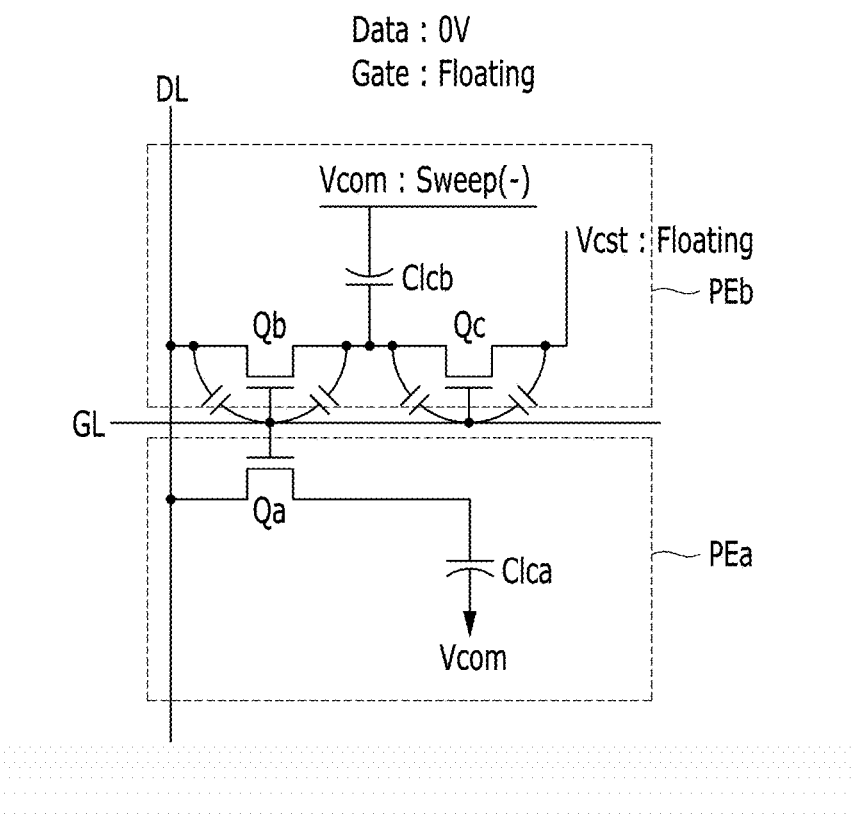
FIG. 19 is an equivalent circuit diagram of one pixel of a mother board assembly when a voltage is applied.

FIG. 19 is an equivalent circuit diagram of one pixel of the mother board assembly when the voltage is applied. Referring to FIG. 19, no short spacer is provided in the gate driving line G1 so that no voltage is applied thereto. Therefore, the gate line GL of the pixel is floated. The data driving line receives the ground voltage which is applied to the first region A1 of the mother board assembly so that a voltage of 0 V is applied to the data line DL of the pixel. The common voltage Vcom is applied with a voltage which is applied to the second region A2. However, no voltage is supplied to the divided reference voltage line RL from the first region A1 nor the second region A2 due to the formation of the third cutting line L3 so that the divided reference voltage line RL is floated. Therefore, electric fields having the same strength are provided in both the first sub-pixel electrode region PEa and the second sub-pixel electrode region PEb by applying the voltage.

Next, light is irradiated from an upper side of the upper mother board 200 to harden the alignment supplement.

When the alignment supplement is an ultraviolet curable monomer, light such as ultraviolet rays may be irradiated onto the liquid crystal layer in order to harden the alignment supplement. As described above, the alignment supplement may be included in at least any one of the lower alignment layer and the upper alignment layer. In an alternative exemplary embodiment, the alignment supplement may be included in the liquid crystal combination layer which is disposed between the upper display panel 400 and the lower display panel 300.

Figure 20:
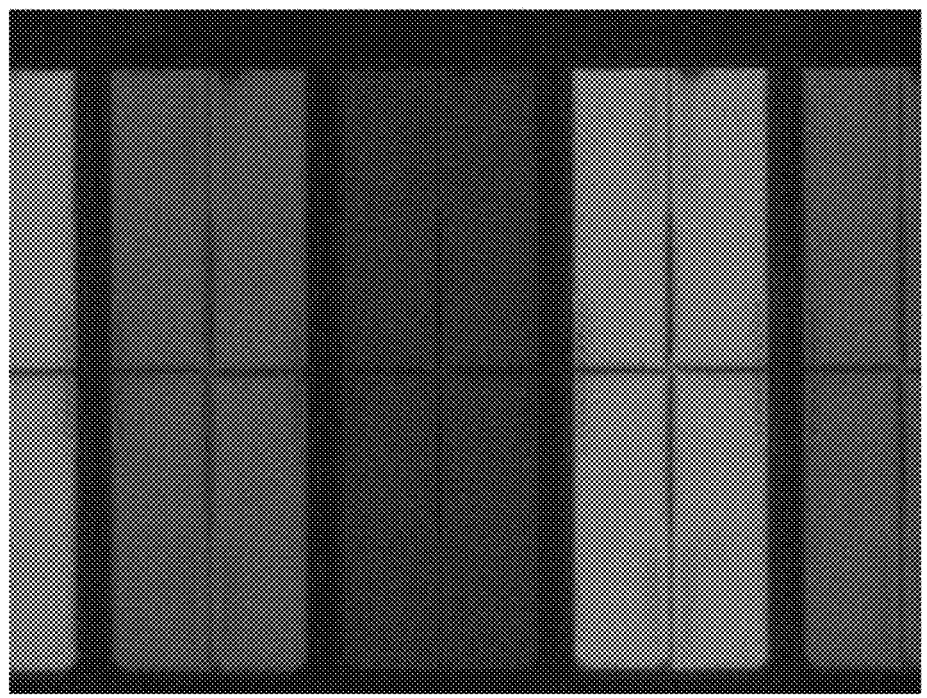
FIG. 20 is an image of a pixel to which a voltage is applied.

As described above, the electric fields having the same strength are provided in both the first sub-pixel electrode region PEa and the second sub-pixel electrode region PEb by applying the voltage so that the liquid crystal molecule may be aligned in both the first sub-pixel electrode region PEa and the second sub-pixel electrode region PEb. FIG. 20 is an image of a pixel to which a voltage is applied. As illustrated in FIG. 20, it is known that an electric field is provided in both the first sub-pixel electrode region PEa and the second sub-pixel electrode region PEb.

Accordingly, the liquid crystal molecule is aligned in both the first sub-pixel electrode region PEa and the second sub-pixel electrode region PEb and when the light is irradiated, the liquid crystal molecule is pretilted in both the first sub-pixel electrode region PEa and the second sub-pixel electrode region PEb.

In this case, the pretilt is first provided in the first sub-pixel electrode region PEa in the previous operations of applying a first voltage and irradiating light. Therefore, after the operations of applying a second voltage and irradiating light, the pretilt of the liquid crystal molecule provided in the first sub-pixel electrode region PEa is larger than the pretilt of the liquid crystal molecule provided in the second sub-pixel electrode region PEb. In this case, a pretilt angle in the first sub-pixel electrode 191*a* region may be larger than a pretilt angle in the second sub-pixel electrode 191*b* region by about 0.1 degree or more.

As described above, in the manufacturing method of an LCD according to the invention, two applying voltages are used to implement different pretilting degrees of the first sub-pixel electrode region and the second sub-pixel electrode region. Generally, when two applying voltages are used, a pretilting degree of the first sub-pixel electrode region may not be different from a pretilting degree of the second sub-pixel electrode region. Therefore, in order to implement different pretilting degree of the first sub-pixel electrode region and the second sub-pixel electrode region, three input voltages are required. However, according to the manufacturing method of an LCD according to the invention, the pretilt is selectively implemented in the first sub-pixel electrode region at first and the additional cutting line is defined to implement the pretilt in the entire region so that only two input voltages are used to provide different pretilting degrees in the first sub-pixel electrode region and the second sub-pixel electrode region.

Now, a manufacturing method of an LCD according to a comparative example of the invention will be described with reference to FIGS. 21 to 23.

Figure 21:
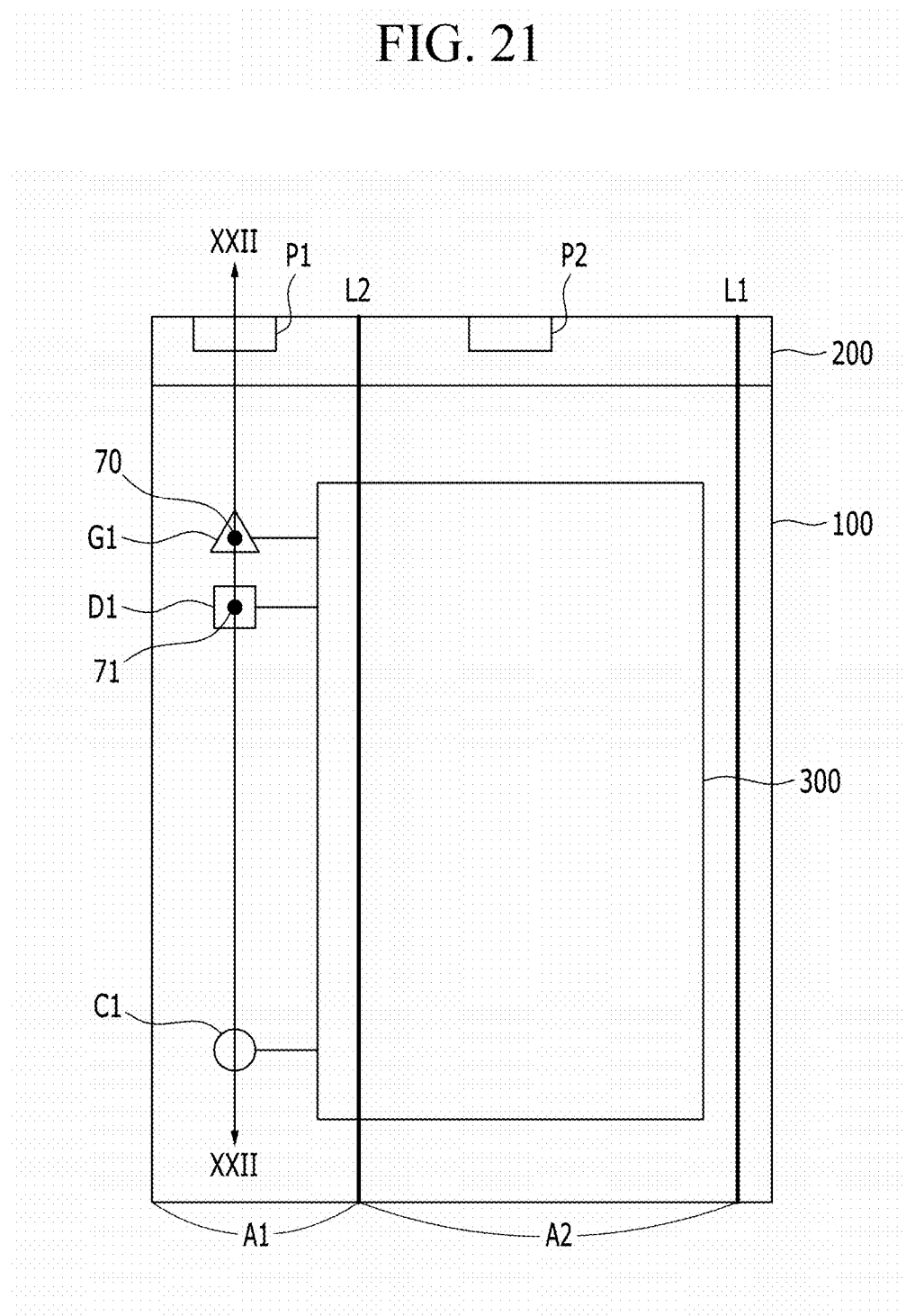
FIG. 21 illustrates a comparative example of a mother board assembly of an LCD according to the invention.
Figure 22:
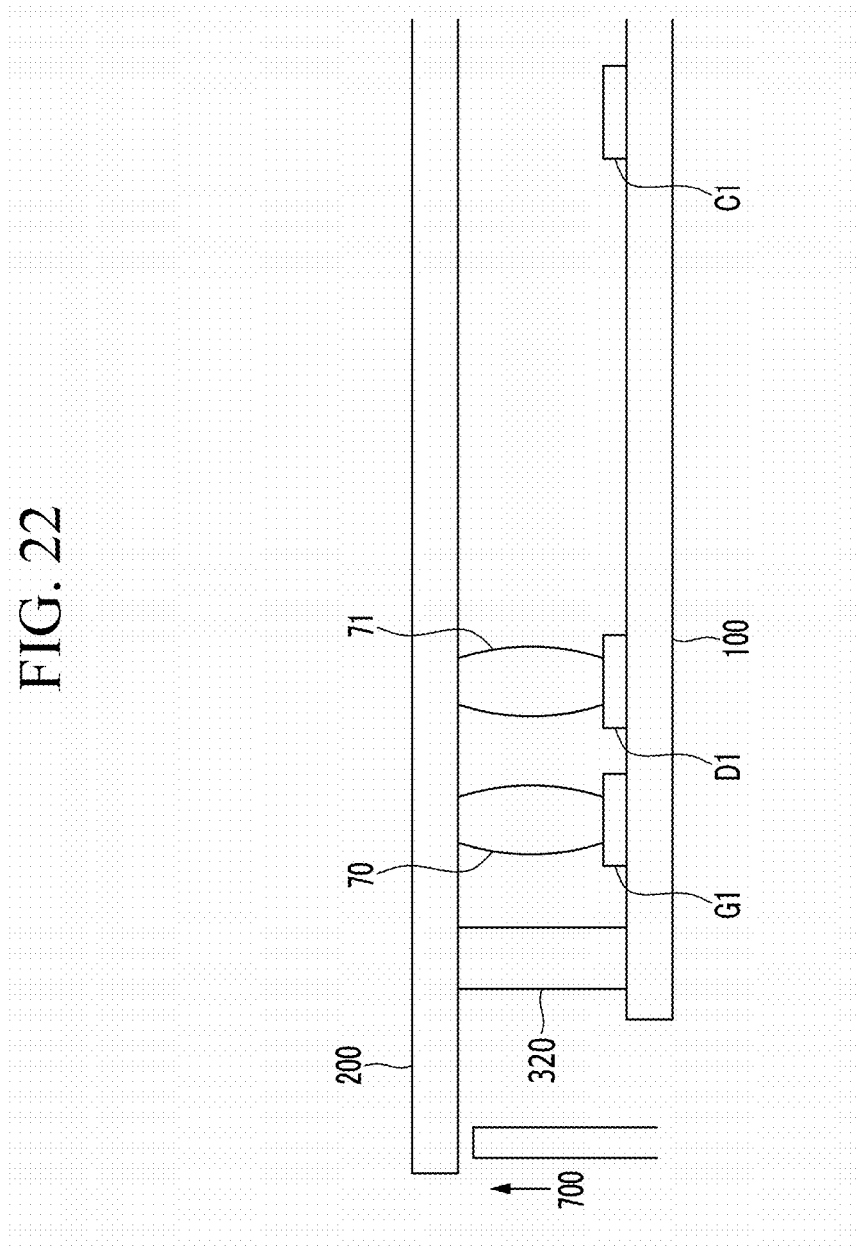
FIG. 22 is a cross-sectional view of a mother board assembly of FIG. 21 taken along line XXII-XXII.

FIG. 21 illustrates a mother board assembly of an LCD according to a comparative example of the invention. FIG. 22 is a cross-sectional view of a mother board assembly of FIG. 21 taken along line XXII-XXII. FIG. 23 is an equivalent circuit diagram of one pixel of a mother board assembly when a voltage is applied. FIG. 24 is an image of a pixel to which a voltage is applied.

Referring to FIG. 21, a lower mother board 100 and an upper mother board 200 are combined and a lower display panel 300 is disposed on the lower mother board 100. A gate driving line G1 and an extension thereof, a data driving line D1 and an extension thereof, and a divided reference voltage driving line C1 and an extension thereof are provided at one side of the lower display panel 300.

A short spacer 70 is disposed on the extension of the gate driving line G1 to bring the gate driving line G1 into contact with the upper mother board 200. Similarly, a short spacer 71 is disposed on the extension of the data driving line D1 to bring the data driving line D1 into contact with the upper mother board 200.

A first cutting line L1 is defined outside the lower display panel 300 to separate adjacent lower display panels 300 from each other. A second cutting line L2 is defined inside the lower display panel 300 to divide the lower display panel 300 into a first region A1 and a second region A2.

The extension of the gate driving line G1, the extension of the data driving line D1, and the extension of the divided reference voltage driving line C1 are disposed in the first region A1 and most areas of the lower display panel 300 is disposed in the second region A2.

Voltage applying probes 700 and 710 are used to apply a voltage to the first region A1 and the second region A2. The voltage which is applied to the first region A1 is a ground voltage, that is, 0 V and the voltage which is applied to the second region A2 is about 9.5 V. Referring to FIG. 22, the ground voltage which is applied to the first region A1 is transmitted along the upper mother board 200 and transmitted to the gate driving line G1 and the data driving line D1 through the short spacer 70. The gate driving line G1 and the data driving line D1 to which the ground voltage is applied transmit the voltage to the gate line GL and the data line DL of each pixel.

However, no short spacer is provided in the divided reference voltage driving line C1 so that no voltage is applied thereto from the upper mother board 200.

The voltage which is applied to the second region A2 is transmitted to the common electrode 270 of the upper display panel 400 of the upper mother board 200. The divided reference voltage driving line C1 is not in contact with the upper mother board 200 in the second region A2 so that no voltage is applied from the upper mother board 200.

Figure 23:
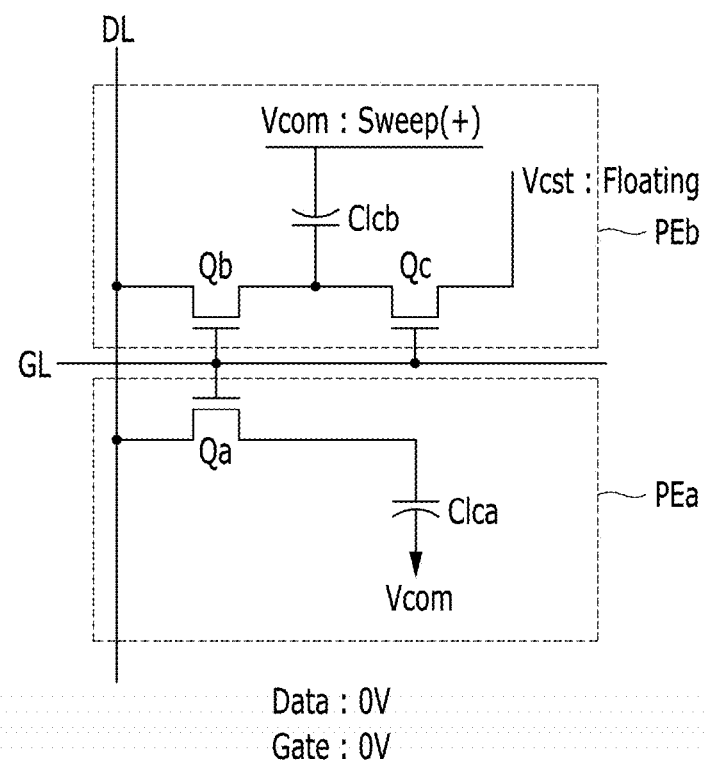
FIG. 23 is an equivalent circuit diagram of one pixel of a mother board assembly when a voltage is applied.
Figure 24:
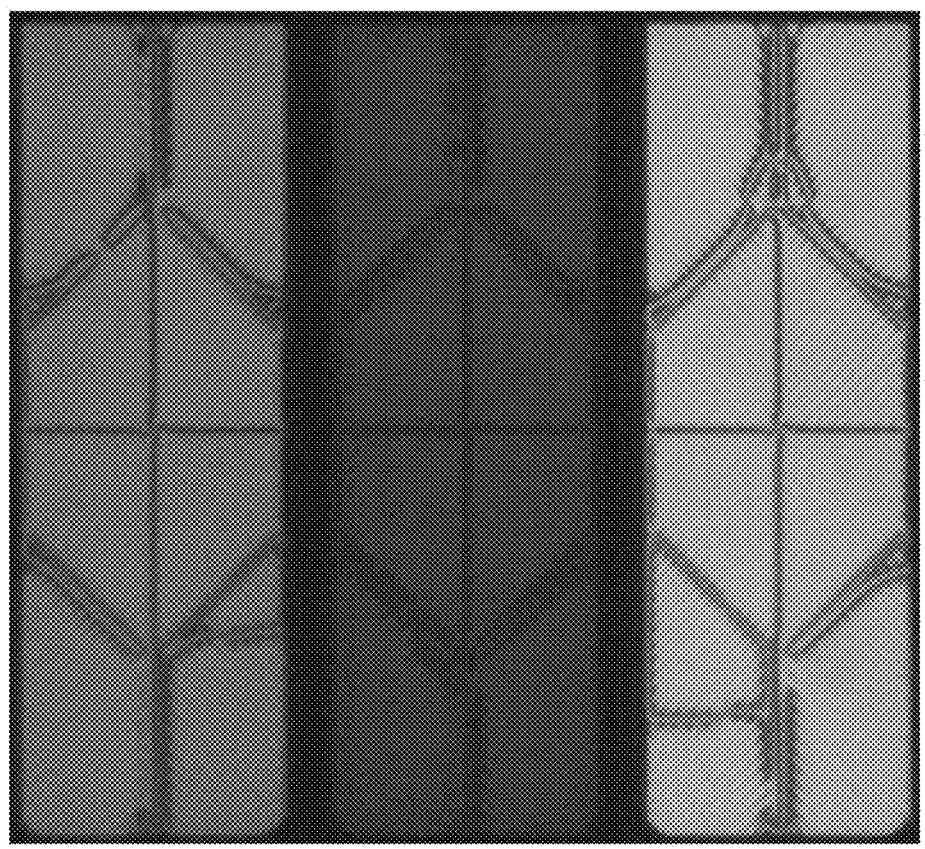
FIG. 24 is an image of a pixel to which a voltage is applied.

FIG. 23 is an equivalent circuit diagram of one pixel of a mother board assembly when a voltage is applied. Referring to FIG. 23, the ground voltage which is applied to the first region A1 of the upper mother board 200 is transmitted to the gate driving line G1 and the data driving line D1 so that 0 V is transmitted to the gate line GL and the data line DL. The common electrode Vcom is applied with a voltage which is transmitted to the second region A2 of the upper mother board 200. The divided reference voltage line Vcst is not in contact with both the first region A1 and the second region A2 of the upper mother board 200 so that the divided reference voltage line is not applied with the voltage and thus is floated.

Accordingly, in the manufacturing method of the LCD according to the comparative example of the invention, the same electric field is provided in the first sub-pixel electrode region PEa and the second sub-pixel electrode region PEb. FIG. 24 is an image of a pixel to which a voltage is applied. As illustrated in FIG. 24, it is known that an electric field is provided in both the first sub-pixel electrode region PEa and the second sub-pixel electrode region PEb. Accordingly, the liquid crystal molecules are aligned in both the first sub-pixel electrode region PEa and the second sub-pixel electrode region PEb, and the liquid crystal molecules are pretilted in both the first sub-pixel electrode region PEa and the second sub-pixel electrode region PEb when the light is irradiated. In this case, the electric fields in the regions are same so that the pretilting degrees of the first sub-pixel electrode region PEa and the second sub-pixel electrode region PEb are same.

That is, in the manufacturing method of an LCD according to the comparative example of the invention, it is difficult to implement different pretilting degrees in the first sub-pixel electrode region PEa and the second sub-pixel electrode region PEb using two input voltages. However, in the manufacturing method of an LCD according to the exemplary embodiment of the invention, a process of defining an additional cutting line after irradiating light is used so that two input voltages are used to implement different pretilting degrees in the first sub-pixel electrode region PEa and the second sub-pixel electrode region PEb.

Figure 25:
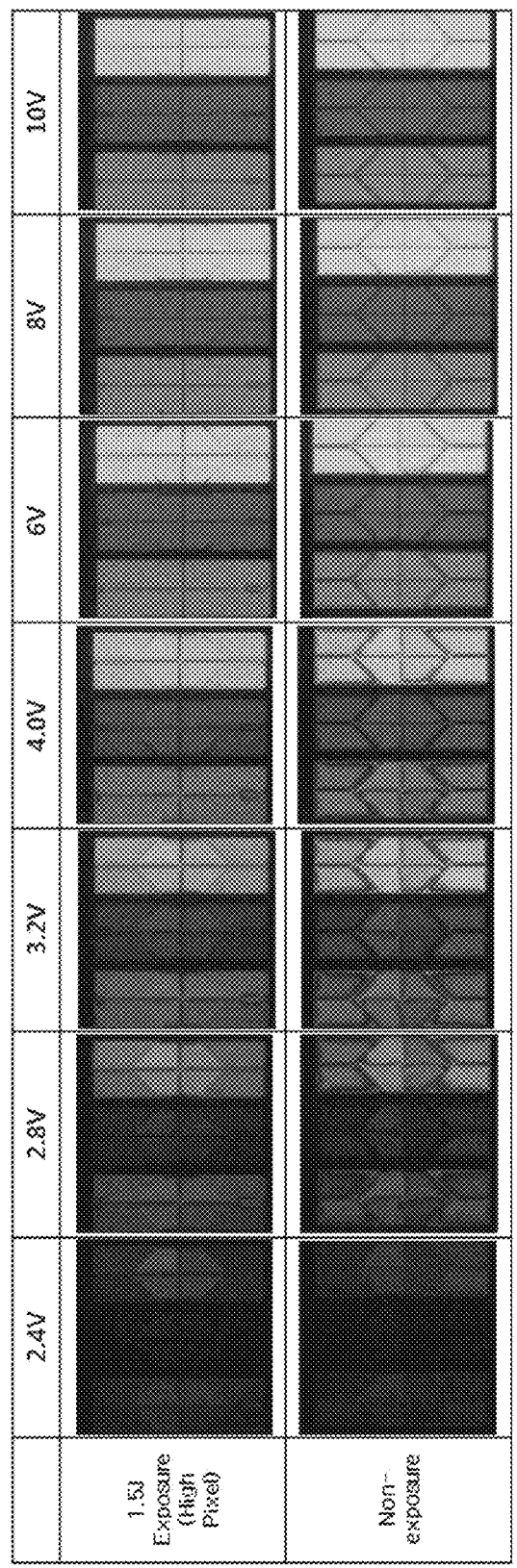
FIG. 25 illustrates comparison of a comparative example of liquid crystal control and a degree of texture of an LCD manufactured by the manufacturing method according to the invention, and an exemplary embodiment of an LCD manufactured by the manufacturing method according to the invention while a voltage is applied to the display devices.

As described above, when the different pretilting degrees are implemented using the manufacturing method of an LCD according to the invention, when a voltage is applied, no texture is generated and liquid crystal is satisfactorily controlled. FIG. 25 is comparison of liquid crystal control and a degree of texture of the LCD manufactured by the manufacturing method according to the comparative example of the invention and the LCD manufactured by the manufacturing method according to the exemplary embodiment of the invention while a voltage is applied to the LCDs.

Referring to FIG. 25, in the LCD (upper) according to the exemplary embodiment of the invention in which the first sub-pixel electrode region (i.e., high pixel) is exposed first with an exposure of 1.5 Joules (J) and then the whole is exposed, it is known that when a voltage is applied, no texture is generated at a border of the first sub-pixel electrode region and the second sub-pixel electrode region and the control of the liquid crystal is excellent.

However, in the LCD according to the comparative example of the invention in which the same pretilt is provided in the first sub-pixel electrode region and the second sub-pixel electrode region, when a low voltage is applied, a spot is visibly recognized in the sub-pixel electrode region and when a high voltage is applied, a boundary of the first sub-pixel electrode region and the second sub-pixel electrode region is clearly visibly recognized.

Therefore, it is confirmed that a performance of the LCD manufactured by the manufacturing method according to the invention has a better result.

In an exemplary embodiment of the invention, an LCD is applied with the voltage which is applied to the upper display panel through a short spacer which is disposed on an extension of a gate driving line, an extension of a data driving line, and an extension of a divided reference voltage driving line which are disposed at one side of a lower display panel.

Accordingly, the LCD according to the exemplary embodiment of the invention includes an extension of the gate driving line, an extension of the data driving line, and an extension of the divided reference voltage driving line which are disposed at one side of a lower display panel and short spacers are disposed on the extension of the data driving line and the extension of the divided reference voltage driving line.

Further, in the LCD according to the exemplary embodiment of the invention, a cutting line is defined in an upper substrate so that the extension of the gate driving line, the extension of the data driving line, and the divided reference voltage driving line may be separated.

Further, in the LCD according to the exemplary embodiment of the invention, a cutting line is defined in the upper substrate so that the LCD may be divided into a first region in which the extension of the gate driving line and the extension of the data driving line are disposed and a third region in which the extension of the divided reference voltage driving line is disposed, and a second region in which only the display panel is disposed.

In the LCD according to the exemplary embodiment of the invention, regions of the upper display panel and the lower display panel in which extensions of the driving lines are disposed may be provided to be cut.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A manufacturing method of a liquid crystal display, comprising:
preparing a lower mother board on which a plurality of lower display panels each including a thin film transistor is provided and a lower alignment layer is applied;
preparing an upper mother board on which a plurality of upper display panels corresponding to the plurality of lower display panels is provided and an upper alignment layer is applied;
providing a liquid crystal combination layer including liquid crystal between the lower mother board and the upper mother board and combining the lower mother board and the upper mother board to form a mother board assembly;
defining a first cutting line and a second cutting line for each of the plurality of upper display panels in the upper mother board of the mother board assembly to divide each of the plurality of upper display panels into a first region and a second region;
applying a primary voltage to the first region and the second region of the upper mother board which are exposed by the lower mother board to pretilt the liquid crystal;
primarily irradiating light onto the mother board assembly from the upper mother board to harden a first alignment supplement which is included in at least one of the liquid crystal combination layer, the lower alignment layer, and the upper alignment layer;
defining a third cutting line in the second region of the upper mother board of the mother board assembly to divide the second region into a second-first region and a third region;
applying a secondary voltage to the first region and the second-first region of the upper mother board which are exposed by the lower mother board to pretilt the liquid crystal; and
secondarily irradiating light onto the mother board assembly from one side to harden a second alignment supplement which is included in at least one of the liquid crystal combination layer, the lower alignment layer, and the upper alignment layer,
wherein
an extension of a data driving line and a part of an edge of each of the plurality of lower display panels are disposed in the first region,
an extension of a divided reference voltage driving line and a center region of each of the lower display panels are disposed in the second region,
the center region of each of the lower display panels is disposed in the second-first region, and
the extension of the divided reference voltage driving line is disposed in the third region.

2. The manufacturing method of claim 1, wherein:
the plurality of lower display panels includes a plurality of pixels, a gate driving line which is connected to a gate line of each pixel, a data driving line which is connected to a data line, and the divided reference voltage driving line which is connected to a divided reference voltage line.

3. The manufacturing method of claim 2, wherein:
the data driving line and the divided reference voltage driving line have extensions which are provided at the same side facing an outside the plurality of lower display panels.

4. The manufacturing method of claim 3, wherein:
a short spacer is disposed on the extension of the data driving line and the extension of the divided reference voltage driving line, and
the extension of the data driving line and the extension of the divided reference voltage driving line are connected to the upper mother board by the short spacer.

5. The manufacturing method of claim 4, wherein:
the first cutting line is defined outside each of the plurality of lower display panels to separate adjacent lower display panels, and
the second cutting line is defined inside each of the lower display panels to separate the extension of the divided reference voltage line from the extension of the data driving line.

6. The manufacturing method of claim 5, wherein:
in the applying the primary voltage to the first region and the second region of the upper mother board which are exposed by the lower mother board to pretilt the liquid crystal,
the voltage which is applied to the first region is transmitted to the data driving line through the short spacer which is disposed on the extension of the data driving line.

7. The manufacturing method of claim 6, wherein:
the voltage which is applied to the first region is a ground voltage.

8. The manufacturing method of claim 5, wherein:
in the applying the primary voltage to the first region and the second region of the upper mother board which are exposed by the lower mother board to pretilt the liquid crystal,
the voltage which is applied to the second region is transmitted to a common electrode of the upper mother board and is transmitted to the divided reference voltage driving line through the short spacer which is disposed on the extension of the divided reference voltage driving line.

9. The manufacturing method of claim 8, wherein:
the voltage which is applied to the second region is about −9.5 volts.

10. The manufacturing method of claim 9, wherein:
in the primarily irradiating light onto the mother board assembly from the upper mother board to harden the first alignment supplement which is included in at least one of the liquid crystal combination layer, the lower alignment layer, and the upper alignment layer,
only liquid crystal of a first sub-pixel area of a pixel is pretilted and liquid crystal of a second sub-pixel area is not pretilted.

11. The manufacturing method of claim 1, wherein:
the third cutting line is continuously defined with an extension direction of the second cutting line, and
the extension of the divided reference voltage driving line is disposed in the third region which is separated by defining the third cutting line.

12. The manufacturing method of claim 11, wherein:
in the applying the secondary voltage to the first region and the second-first region of the upper mother board which are exposed by the lower mother board to pretilt the liquid crystal,
the voltage which is applied to the first region is transmitted to the data driving line through the short spacer which is disposed on the extension of the data driving line.

13. The manufacturing method of claim 12, wherein:
the voltage which is applied to the first region is a ground voltage.

14. The manufacturing method of claim 13, wherein:
in the applying the secondary voltage to the first region and the second-first region of the upper mother board which are exposed by the lower mother board to pretilt the liquid crystal,
the voltage which is applied to the second-first region is transmitted to the common electrode of the upper mother board.

15. The manufacturing method of claim 14, wherein:
the voltage which is applied to the second-first region is about −9.5 volts.

16. The manufacturing method of claim 1, wherein:
after the secondarily irradiating light onto the mother board assembly from the upper mother board side to harden the second alignment supplement which is included in at least one of the liquid crystal combination layer, the lower alignment layer, and the upper alignment layer,
a pretilting degree of a first sub-pixel area of one pixel is different from a pretilting degree of a second sub-pixel area.

17. The manufacturing method of claim 16, wherein:
the pretilting degree of the first sub-pixel area is larger than the pretilting degree of the second sub-pixel area by about 0.1 degree or more.

* * * * *